(12) United States Patent
Kawamura et al.

(10) Patent No.: US 8,524,186 B2
(45) Date of Patent: Sep. 3, 2013

(54) CARBON-BASED CATALYST FOR FLUE GAS DESULFURIZATION AND METHOD OF PRODUCING THE SAME AND USE THEREOF FOR REMOVING MERCURY IN FLUE GAS

(75) Inventors: Kazushige Kawamura, Yokohama (JP); Dai Takeda, Yokohama (JP); Eiji Awai, Yokohama (JP)

(73) Assignee: Chiyoda Corporation, Yokohama-shi, Kanagawa (JP)

( * ) Notice: Subject to any disclaimer, the term of this patent is extended or adjusted under 35 U.S.C. 154(b) by 145 days.

(21) Appl. No.: 12/933,265

(22) PCT Filed: Jun. 4, 2008

(86) PCT No.: PCT/JP2008/060631
§ 371 (c)(1),
(2), (4) Date: Sep. 17, 2010

(87) PCT Pub. No.: WO2009/116183
PCT Pub. Date: Sep. 24, 2009

(65) Prior Publication Data
US 2011/0020205 A1    Jan. 27, 2011

(30) Foreign Application Priority Data

Mar. 19, 2008    (JP) ................................. 2008-071771

(51) Int. Cl.
*C01B 31/08* (2006.01)
*B01D 53/48* (2006.01)

(52) U.S. Cl.
USPC ......... 423/242.2; 502/159; 502/181; 502/417

(58) Field of Classification Search
USPC ........................ 423/242.2; 502/159, 181, 417
See application file for complete search history.

(56) References Cited

U.S. PATENT DOCUMENTS

| | | | | |
|---|---|---|---|---|
| 4,174,373 | A * | 11/1979 | Yoshida et al. ............ | 423/239.1 |
| 6,534,024 | B2 | 3/2003 | Honjo et al. | |
| 6,616,905 | B1 | 9/2003 | Kawamura et al. | |
| 2001/0007647 | A1 | 7/2001 | Honjo et al. | |
| 2003/0190270 | A1 | 10/2003 | Yasutake et al. | |
| 2004/0013589 | A1 | 1/2004 | Vosteen et al. | |
| 2004/0202596 | A1 | 10/2004 | Honjo et al. | |

FOREIGN PATENT DOCUMENTS

| | | |
|---|---|---|
| CA | 2407923 A1 | 10/2002 |
| CN | 101048218 A | 10/2007 |
| EP | 1374977 A1 | 1/2004 |
| GB | 1090306 A | 11/1967 |
| JP | 49-053590 A | 5/1974 |
| JP | 49-053591 A | 5/1974 |
| JP | 60-232235 A | 11/1985 |
| JP | 1-53087 B2 | 11/1989 |
| JP | 07-289844 A | 11/1995 |
| JP | 9-308817 A | 12/1997 |
| JP | 10-216476 A | 8/1998 |
| JP | 10-314588 A | 12/1998 |
| JP | 11-290688 A | 10/1999 |
| JP | 11-347362 A | 12/1999 |
| JP | 2000-024461 A | 1/2000 |
| JP | 2000-325746 A | 11/2000 |
| JP | 2001-162135 A | 6/2001 |
| JP | 2002-301335 A | 10/2002 |
| JP | 2003-010688 A | 1/2003 |
| JP | 2004-066229 A | 3/2004 |
| JP | 2004-313833 A | 11/2004 |
| JP | 2005-246252 A | 9/2005 |
| JP | 2005-288380 A | 10/2005 |
| WO | 99/51337 A1 | 10/1999 |
| WO | 02/081064 A1 | 10/2002 |
| WO | 2006/039007 A2 | 4/2006 |

OTHER PUBLICATIONS

Notification of Transmittal of Translation of the International Preliminary Report on Patentability (Form PCT/IB/338) of International Application No. PCT/JP2008/060631 mailed Nov. 11, 2010 with Forms PCT/IB/373, PCT/ISA/237, and PCT/IB/326.
Japanese Office Action dated Jun. 7, 2011, issued in corresponding Japanese Patent Application No. 2006-328329.
International Search Report of PCT/JP2009/060631, mailing date Aug. 12, 2008.
Japanese Office Action mailed May 29, 2012, issued in corresponding Japanese Patent Application No. 2006-328329, w/ English translation.
Chinese Office Action dated Apr. 1, 2012, issued in corresponding Chinese Patent Application No. 200880128131.0.
Japanese Office Action dated Jun. 4, 2013, issued in corresponding Japanese Patent Application No. 2008-071771, with English Translation.
Takeuchi, Y., "Saishin Kyuchaku Binran (Newest Adsorption Handbook)—Process, Material and Design—", 1999, First ed., pp. 194-197 and 141-143, cited in Japanese Office Action dated Jun. 4, 2013.

* cited by examiner

*Primary Examiner* — Stuart Hendrickson
(74) *Attorney, Agent, or Firm* — Westerman, Hattori, Daniels & Adrian LLP

(57) ABSTRACT

A carbon-based catalyst for flue gas desulfurization is brought into contact with a flue gas containing at least $SO_2$ gas, oxygen and water vapor so that the $SO_2$ gas can react with the oxygen and the water vapor to form sulfuric acid which is to be recovered. On a surface of the carbon-based catalyst, iodine, bromine or a compound thereof is added, ion exchanged or supported and a water-repellent treatment is applied. The carbon-based catalyst can also be used as a mercury adsorbent for flue gas treatment for adsorbing and removing metallic mercury from a flue gas containing metallic mercury, $SO_2$ gas, oxygen and water vapor.

22 Claims, 7 Drawing Sheets

FIG. 8

| ACTIVATED CARBON CATALYST | TREATMENT CONDITION | SYMBOL IN THE DRAWING | TREATMENT TIME (h) | SUPPORTED AMOUNT OF IODINE (wt %) | DESULFURIZATION ACTIVITY RATIO (-) |
|---|---|---|---|---|---|
| EX. 1 | — | — | 0 | 5 | 1.6 |
| EX. 2 | 25°C | ○ | 6 | | 2.2 |
| | | | 12 | | 2.6 |
| | | | 20 | | 2.5 |
| | 60°C | ● | 10 | | 2.5 |
| EX. 9 | GHSV=5-10h$^{-1}$ | ◇ | 2 | | 2.7 |
| | | | 5 | | 2.5 |
| | GHSV=15-20h$^{-1}$ | ◆ | 1 | | 2.0 |
| | | | 2 | | 2.5 |
| EX. 10 | 25°C | △ | 12 | | 2.1 |
| | | | 30 | | 2.7 |
| | 60°C | ▲ | 25 | | 2.4 |
| EX. 11 | GHSV=5-10h$^{-1}$ | □ | 3 | | 2.5 |
| | | | 5 | | 2.7 |
| | GHSV=15-20h | ■ | 1 | | 2.1 |
| | | | 2 | | 2.6 |

US 8,524,186 B2

CARBON-BASED CATALYST FOR FLUE GAS DESULFURIZATION AND METHOD OF PRODUCING THE SAME AND USE THEREOF FOR REMOVING MERCURY IN FLUE GAS

TECHNICAL FIELD

The present invention relates to a carbon-based catalyst for flue gas desulfurization for recovering and removing sulfur oxides contained in a flue gas as sulfuric acid by catalytic desulfurization, and a method of producing such a carbon-based catalyst.

The present invention also relates to a mercury adsorbent for flue gas treatment for adsorbing and removing mercury contained in the flue gas, in particular, metallic mercury, and a flue gas treatment method that uses such a mercury adsorbent.

BACKGROUND ART

In general, a method of removing sulfur dioxide ($SO_2$) in the flue gas is divided into two processes, one of which is a wet process where $SO_2$ gas is absorbed by an absorbing liquid and removed and the other one of which is a dry process where $SO_2$ gas is adsorbed by an adsorbent and removed. When a large amount of flue gas containing high-concentration $SO_2$ gas is treated, a wet process is broadly adopted. However, when a flue gas relatively low in concentration or small in amount is treated, in some cases, a dry process that is simple in structure and easy to maintain and manage can be adopted.

As a dry flue gas treatment process, a flue gas desulfurization process (catalytic desulfurization) where sulfur oxides such as $SO_2$ gas and the like contained in a flue gas are oxidized with oxygen present at low temperatures to finally recover as sulfuric acid is known. When as such a catalyst that oxidizes $SO_2$ gas and the like in the flue gas, a ceramic support such as alumina, silica, titania or zeolite is used, activity is deficient by itself; accordingly, as a catalyst species, metal or metal oxide has to be added. Furthermore, since the catalyst species suffers an attack from generated sulfuric acid to dissolve or denature, there is a disadvantage that the activity cannot be stably maintained over a long period of time. As the result thereof, as the catalyst, activated carbon that is excellent in acid resistance and thereby can maintain stable activity over a long period of time without undergoing deterioration has been most preferably used.

However, when commercially available activated carbon is used as it is as the catalyst, a problem is that catalyst activity in the catalytic desulfurization is low and generated sulfuric acid cannot be smoothly exhausted; accordingly, in order to obtain desired desulfurization effect, the catalyst has to be added much and regenerated periodically, resulting in poor economical efficiency.

In this connection, in, for example, Japanese Patent Application Laid-Open No. 2005-288380, a gas processing method capable of repeatedly processing odor components, air pollutants and the like in gas over a long period of time has been proposed. In the method, a gas to be treated is, after moisturizing so as to exceed 100% in relative humidity, brought into contact with an activated carbon-containing honeycomb or a chemical-supported activated carbon-containing honeycomb that supports a chemical such as iodine, bromine, acid, a platinum compound or the like so as to remarkably improve treatment efficiency.

According to the above-mentioned gas processing method, it is said that, when the relative humidity of a gas to be treated is controlled to a super-saturated state, that is, so as to exceed 100%, in a contact with an activated carbon-containing honeycomb, a thin water film is uniformly formed over a surface of the activated carbon-containing honeycomb, odor components and air pollutants are oxidized on a surface of the activated carbon-containing honeycomb to form compounds dissolvable in water, the water-soluble reaction products are gradually eluted through a water film from a surface of the activated carbon-containing honeycomb to detach from the activated carbon-containing honeycomb, thereby the activated carbon-containing honeycomb is self-regenerated to greatly lengthen a treatment life.

However, according to the gas processing method, separately, the relative humidity of a gas to be treated needs to be controlled by sprinkling or spraying water or an aqueous solution to the gas to be treated, or by bubbling the gas to be treated in an aqueous solution, followed such as by using a humidifier so as to exceed 100%; accordingly, a problem is that energy consumption necessary for gas treatment becomes larger.

Furthermore, in order to uniformly generate a thin water film on a surface of an activated carbon-containing honeycomb, the relative humidity is controlled so as to exceed 100%. However, a gas to be treated and the activated carbon-containing honeycomb are inhibited from directly coming into contact with each other to result in difficulty in exerting catalyst performance of the activated carbon; accordingly, another problem is that, an amount of the activated carbon-containing honeycomb necessary to obtain desired desulfurization effect becomes larger.

Furthermore, as described in the same literature that the activated carbon-containing honeycomb deteriorated in treatment capacity owing to long term usage can be repeatedly used by sprinkling water, a problem which remains is that the activated carbon-containing honeycomb itself necessitates a regeneration treatment owing to water sprinkling for every definite term. That is, a development of catalysts with higher activities is desired.

On the other hand, separately from a demand for a catalyst high in desulfurization activity, there is a following requirement.

That is, in a combustion flue gas exhausted from a boiler of a thermal power plant, in addition to generally contained $SO_2$ gas, depending on a kind of fossil fuel (in particular, coal) to be combusted, in some cases, mercury is contained at high concentration. Mercury is a poisonous material that causes health hazards when exhausted in the environment; accordingly, the mercury has to be removed before releasing flue gas in air. Accordingly, recently, a restriction that makes removal of, in addition to $SO_2$ gas, mercury compulsory has started.

In mercury in the flue gas, there is oxidized mercury ($Hg^{2+}$) present in the form of divalent mercury compounds oxidized in a combustion furnace or by an oxidizing catalyst of $NO_x$ removal apparatus and elementary mercury) ($Hg^0$) present in the form of simple (0-valent) metallic mercury. Among these, $Hg^{2+}$ is almost removed by a flue gas desulfurization apparatus of wet system. However, $Hg^0$ is low in solubility to an absorption liquid and thereby low in removal efficiency; accordingly, at the present time, almost all thereof is not removed and is diffused into the air.

In this connection, a method of more oxidizing $Hg^0$ in a flue gas to $Hg^{2+}$ by adding a halogen compound such as hydrogen chloride, calcium bromide or the like to a flue gas or coal that is a fuel or by making use of an oxidizing catalyst of a $NO_x$ removal apparatus has been proposed (Japanese Patent Application Laid-Open No. 2004-66229). However, there is a problem with catalyst lifetime and moreover since the diffusion of $Hg^0$ in the flue gas becomes rate-determining, it is difficult to achieve a high oxidizing efficiency. That is, it is difficult to stably oxidize $Hg^0$ to $Hg^{2+}$ at high efficiency over a long period of time.

Furthermore, also a method of adding a Hg fixing agent such as a chelating agent, a potassium iodide (KI) solution or the like to an absorption liquid of a wet flue gas desulfurization apparatus, or adding an oxidizing agent such as hypochlorous acid, hydrogen peroxide or the like has been proposed (Japanese Patent Application Laid-Open No. H10-216476). However, the Hg fixing agent or oxidizing agent is decomposed via a reaction with other metal, consumed in oxidation of $SO_2$ gas in the flue gas, or volatilized and diffused from a stack; accordingly, a problem is that an added amount of the adding agent increases. When a chelating agent is added, another problem is that the chelating agent is decomposed to generate hydrogen sulfide ($H_2S$) to diffuse bad odor.

In a method where various kinds of additives are added to an absorption liquid, it is known that, when a state of the absorption liquid is varied depending on a variation of an electric generation load or a variation of a flue gas composition, $Hg^0$ absorbed once in the absorption liquid is re-released or $Hg^{2+}$ in the absorption liquid is reduced to $Hg^0$ and released; accordingly, also a technology that does not re-release $Hg^0$ is under development (Japanese Patent Application Laid-Open No. 2004-313833). Furthermore, in a method where an oxidizing agent such as hypochlorous acid, hydrogen peroxide, chromic acid, or chlorine is used, a reaction between an oxidizing agent and $SO_2$ gas in the flue gas cannot be avoided to result in a large loss of the oxidizing agent; accordingly, it has been proposed to spray the oxidizing agent on a gas downstream side of a flue gas desulfurization apparatus (Japanese Patent Application Laid-Open No. 2001-162135).

On the other hand, as a method of removing $Hg^0$ not by absorbing in an absorption liquid of a wet flue gas desulfurization apparatus but by a separate method, a method where a powder of activated carbon is added and dispersed in a flue gas in a gas region where a temperature is about 100 to 150° C. and the $Hg^0$ is adsorbed by activated carbon powder to remove has been known (Japanese Patent Application Laid-Open No. H9-308817). Furthermore, it has been known for long that activated carbon supporting bromide or the like is effective in removing mercury (Japanese Patent Application Laid-Open Nos. S49-53590 and S43-53591). However, mercury adsorption capacity of the activated carbon is generally low; accordingly, from the viewpoint of uniform contact, unless an added amount to the flue gas is increased, an advantage cannot be obtained. As the result thereof, the activated carbon much added into the flue gas has to be collected together with fry ash on a downstream side, and for this, a large electrostatic precipitator has to be installed, and an apparatus for processing the activated carbon collected in a state mixed with fry ash is necessary. The methods are applied on an upstream side of wet flue gas desulfurization apparatus or used in combination with a dry or semi-dry flue gas desulfurization apparatus to remove mercury contained in the flue gas at certain extent high concentrations. That is, the methods do not remove low concentration mercury such as contained in an exit gas of the wet flue gas desulfurization apparatus.

On the other hand, a method where activated carbon supporting iodine or the like is brought into contact with an exit gas of a wet flue gas desulfurization apparatus, in more detail, an exit gas of a wet electrostatic precipitator disposed on a downstream side of a wet flue gas desulfurization apparatus, to remove mercury in the flue gas has been proposed (Japanese Patent Application Laid-Open No. H10-216476). However, according to the method, a wet electrostatic precipitator is disposed on an upstream side of the mercury removing apparatus; accordingly, an exit gas of the wet flue gas desulfurization apparatus does not contain mist in the flue gas. Furthermore, a gas re-heater is used to elevate a temperature to 77° C. or more. That is, by elevating a temperature to lower the relative humidity, in essence, after a condition close to that of an upstream side of the wet flue gas desulfurization apparatus is established, a process is conducted with iodine-supported activated carbon.

As mentioned above, a problem of a conventional method where mercury in the flue gas is absorbed by an absorption liquid of wet flue gas desulfurization apparatus and removed is that it is difficult to stably maintain high mercury removal efficiency over a long period of time. Furthermore, an oxidizing agent for oxidizing mercury is consumed to oxidize $SO_2$ gas or a chelating agent for collecting mercury reacts with other metal to cause big loss; accordingly, another problem is that an added oxidizing agent or chelating agent is not effectively used, mercury is insufficiently oxidized, and $Hg^0$ is re-released from the absorption liquid.

On the other hand, in a method where activated carbon powder is dispersed in the flue gas to adsorb and remove mercury, as mentioned above, an addition amount of the activated carbon becomes larger because of small in the mercury adsorption capacity of the activated carbon; accordingly, a problem is that the cost is disadvantageous when the cost of post-processing is included. Furthermore, when a concentration of water vapor or $SO_2$ gas in the flue gas is high, the mercury adsorption capacity of the activated carbon is remarkably lowered, and, even when activated carbon supporting a halogen compound such as a bromine compound or the like is used, sufficient adsorption capacity cannot be obtained; accordingly, in the case of using in combination with a wet flue gas desulfurization apparatus, when processed on an upstream side thereof, $SO_2$ gas affects greatly, and when processed on a downstream side, water vapor greatly affects, that is, when a treatment is conducted on either side thereof, there is a dilemma that a large decrease in the adsorption capacity of the activated carbon cannot be avoided. Accordingly, in many cases, adsorption treatment with activated carbon is combined with the dry flue gas desulfurization. That is, it is not usually assumed to combine with wet flue gas desulfurization high in desulfuration efficiency, in particular, to use on a downstream side of the wet flue gas desulfurization apparatus.

DISCLOSURE OF THE INVENTION

The present invention was conducted in view of the above-described situations and an object thereof is to provide a carbon-based catalyst for flue gas desulfurization that can maintain stable desulfurization performance continuously over a long period of time and is highly active and capable of greatly reducing an amount of catalyst necessary for processing flue gas, and a method of producing such a carbon-based catalyst.

Furthermore, another object of the present invention is to provide a mercury adsorbent for flue gas treatment that can efficiently adsorb and remove metallic mercury remaining in the flue gas even when high humidity flue gas containing water vapor or mist is processed on a downstream side of a wet flue gas desulfurization apparatus, and a method of processing flue gas, which uses such a mercury adsorbent.

In order to achieve the object, the present invention provides a carbon-based catalyst for flue gas desulfurization that is brought into contact with a flue gas containing at least SO$_2$ gas, oxygen and water vapor so that the SO$_2$ gas can react with the oxygen and the water vapor to form sulfuric acid which is to be recovered, wherein, on a surface of the carbon-based catalyst, iodine, bromine or a compound thereof is added, ion exchanged or supported and a water-repellent treatment is applied to the carbon-based catalyst.

The carbon-based catalyst is preferred to be activated carbon or activated carbon fiber. Furthermore, the iodine or bromine compound is preferred to be any of alkali metal salts, alkaline earth metal salts, transition metal salts, hydrides, oxo acids and organic compounds of iodine or bromine.

An added, ion exchanged or supported amount of the iodine or compound thereof to the carbon-based catalyst is preferably in the range of 0.020% by weight or more and 60% by weight or less as iodine. Furthermore, an added, ion exchanged or supported amount of the bromine or compound thereof to the carbon-based catalyst is preferably in the range of 0.010% by weight or more and 60% by weight or less as bromine.

The water-repellent treatment is preferably conducted by allowing containing a resin having a contact angle of 90° or more to water in the carbon-based catalyst, or by heating the carbon-based catalyst to remove hydrophilic groups on a surface thereof.

In the carbon-based catalyst for flue gas desulfurization of the present invention, on a carbon-based catalyst, iodine, bromine or a compound thereof is added, ion-exchanged or supported. Accordingly, when the catalyst comes into contact with the flue gas containing at least SO$_2$, oxygen and water vapor, on the carbon-based catalyst, for example, for iodine, reactions illustrated below are caused.

$$4I^- + 4H + O_2 \rightarrow 2I_2 + 2H_2O \quad \text{(Formula 1)}$$

$$I_2 + SO_3^{2-} + H_2O \rightarrow 2I^- + H_2SO_4 \quad \text{(Formula 2)}$$

Thereby, iodine or the like on the carbon-based catalyst works like a promoter to improve desulfurization performance. In addition, since the carbon-based catalyst is water repellent treated, sulfuric acid generated in the formula 2 is continuously and smoothly released from the carbon-based catalyst; accordingly, without regenerating sprinkled water or the like over a long period of time, the desulfurization performance can be continuously and stably maintained.

That is, in the above-mentioned Japanese Patent Application Laid-Open No. 2005-288380, it is important to uniformly form a water film on a catalyst surface and, in this connection, relative humidity in the flue gas is controlled so as to be higher than 100%. On the other hand, since a catalyst of the present invention is water repellent treated, a water film is not formed uniformly on a catalyst surface, that is, a dry area is generated on a surface of a carbon-based catalyst. Thereby, SO$_2$ gas in the flue gas, without a water film, can be directly brought into contact with a carbon-based catalyst, thereby, a reaction is promoted, and the generated sulfuric acid aqueous solution can be smoothly united and naturally detached from the catalyst.

Furthermore, in a dry area on the carbon-based catalyst, an effect of iodine and bromine is greatly developed; accordingly, a high desulfurization performance can be obtained. In addition, also in a range where the relative humidity in the flue gas does not exceed 100%, the desulfurization performance that is sufficiently high and does not deteriorate with time can be obtained. As the result thereof, while, in the Japanese Patent Application Laid-Open No. 2005-288380, since generated sulfuric acid is piled up on the catalyst, when treatment performance is deteriorated because of long term use, a regeneration treatment where the sulfuric acid is removed by sprinkling water has to be repeated, in the catalyst of the present invention, since there is no such performance deterioration, there is no need of the regeneration treatment.

In the background art found in the Japanese Patent Application Laid-Open No. 2005-288380, water vapor is indispensable and the higher the concentration of the water vapor is, the higher the performance is. By comparison, it is known that when the relative humidity is 80% or less, the performance is deteriorated to an extent where the practicality is lost. By contrast, in the case where the inventive catalyst is used, different from the background art, when the relative humidity is 30% or more, preferably 60% or more, practical performance can be secured; accordingly, the moistening operation becomes unnecessary, or a simple cooling and moistening operation with water spraying and the like is enough and furthermore without conducting regeneration with water sprinkling, stable and high desulfurization performance can be obtained.

Furthermore, in the inventive carbon-based catalyst, since, in addition to addition, ion exchange or support of iodine and bromine, a water-repellent treatment is conducted, also in long-term use, sulfuric acid is less piled up on the carbon-based catalyst, that is, a piled up amount does not one-sidedly increase; accordingly, stable desulfurization performance can be maintained and the need for a regeneration treatment can be eliminated. Like this, the carbon-based catalyst is water repellent treated; accordingly, even when the catalyst is always moistened with industrial water or a sulfuric acid aqueous solution, a dry area can be maintained and thereby stable performance can be obtained; accordingly, for example, the carbon-based catalyst can be used also with always sprinkling industrial water or a sulfuric acid aqueous solution thereon.

Furthermore, the present invention provides a method of producing a carbon-based catalyst for flue gas desulfurization, in which the carbon-based catalyst is brought into contact with flue gas containing at least SO$_2$ gas, oxygen and water vapor to allow the SO$_2$ to react with the oxygen and water vapor to form sulfuric acid, and the sulfuric acid is recovered. In the method, after clogging the inside of pores by moistening the carbon-based catalyst, a solution containing iodine, bromine or a compound thereof is sprayed or sprinkled to the carbon-based catalyst or the carbon-based catalyst is immersed in the solution to add, ion exchange or support the iodine, bromine or the compound thereof on a surface of the carbon-based catalyst.

In the method, as the carbon-based catalyst, activated carbon or activated carbon fiber is preferably used. Furthermore, to the carbon-based catalyst, the iodine or compound thereof is added, ion exchanged or supported preferably in the range of 0.020% by weight or more and 60% by weight or less as iodine. Alternatively, to the carbon-based catalyst, the bromine or compound thereof is added, ion exchanged or supported preferably in the range of 0.010% by weight or more and 60% by weight or less as bromine. The carbon-based catalyst is preferably water repellent treated.

In the method, when the carbon-based catalyst is moistened to clog the inside of pores, a carbon-based catalyst and water are poured in a vessel, and the inside of the vessel is depressurized, maintained there for a certain time and returned to atmospheric pressure to make the water intrude inside of the pores. Alternatively, the inside of pores of the carbon-based catalyst may be clogged with condensed water by a flowing mixed gas of water vapor and air to the carbon-based catalyst to condense the water vapor.

In the carbon-based catalyst for flue gas desulfurization obtained according to the inventive producing method, on a surface of a carbon-based catalyst, iodine, bromine or a compound thereof is added, ion exchanged or supported. Accordingly, when the catalyst comes into contact with flue gas containing $SO_2$ gas, oxygen and water vapor, as illustrated in the formulas 1 and 2, iodine or the like on the carbon-based catalyst works like a promoter to be able to improve the desulfurization performance.

Now, when the iodine or the like is simply added, ion exchanged or supported on the carbon-based catalyst, the iodine or the like is added, ion exchanged or supported to the inside of micro-pores of the carbon-based catalyst. However, immediately after the start of desulfurization to the flue gas, the inside of pores of the carbon-based catalyst is filled with sulfuric acid and does not contribute to reactions thereafter.

In the point, in the inventive producing method, after the carbon-based catalyst is moistened in advance to fill and clog the inside of pores with water or the like, the iodine or the like is added, ion exchanged or supported; accordingly, in the neighborhood of a surface of the carbon-based catalyst where a catalytic sulfation continuously occurs, the iodine or the like can be selectively added, ion exchanged or supported; accordingly, the additive such as the iodine or the like can be more effectively utilized.

In the present inventive producing method, when a carbon-based catalyst is moistened to clog the inside of pores thereof, air inside of the pores of the carbon-based catalyst is difficult to come out and the carbon-based catalyst itself has water repellency to some extent; accordingly, the carbon-based catalyst has to be forcibly immersed or left in the liquid for a relatively long period of time. Accordingly, for example, a so-called impregnation under reduced pressure or steam addition can be preferably used.

Furthermore, also in the case, when a water repellent treatment is applied to the carbon-based catalyst, generated sulfuric acid can be released at an early time from on the carbon-based catalyst. At this time, a water repellent treatment step to the carbon-based catalyst can be conducted as a pretreatment of a step of moistening the inside of pores of the carbon-based catalyst and a step of adding, ion exchanging and supporting the iodine or the like, alternatively as a post-treatment thereof.

However, when, after the step of adding, ion exchanging or supporting the iodine or bromine is conducted, the step of water repellent treatment is conducted, followed by the step of clogging the inside of the pores of the carbon-based catalyst, depending on the water repellent treatment step or molding step, by over-heating, iodine is vaporized or iodine is re-dissolved and detached to be less effective. Accordingly, when a sufficient iodine supporting amount is tried to secure, the water repellence becomes insufficient to result in care of inviting performance deterioration. In this connection, it is preferred to, after the water repellent treatment step and molding step are conducted, the step of clogging the inside of pores of the carbon-based catalyst is conducted, followed by conducting the step of adding, ion exchanging or supporting iodine or bromine.

However, when, after the water repellent treatment, an attempt to conduct the step of clogging the inside of pores of the carbon-based catalyst is made, the carbon-based catalyst repels water. Accordingly, when the water repellent treatment is applied to a carbon-based catalyst as a pretreatment, in particular, impregnation under reduced pressure or steam addition is preferably used.

Furthermore, when considering that the carbon-based catalyst itself has high water repellence, even when the impregnation under reduced pressure is used, it takes a rather long time to sufficiently clog the inside of pores with water. Accordingly, the steam addition method is more preferably used. At this time, a method of a flowing mixed gas to a carbon-based catalyst is preferably an upflow from the viewpoint of gas dispersion.

An amount of adding, ion exchanging or supporting the iodine or the compound thereof to the carbon-based catalyst is limited, as iodine, in the range of 0.020% by weight or more and 60% by weight or less, and an amount of adding, ion exchanging or supporting the bromine or the compound thereof to the carbon-based catalyst is limited, as bromine, in the range of 0.010% by weight or more and 60% by weight or less. This is because, as will be described below, when iodine or bromine is deviated from the range, in both cases, the desulfurization activity ratios are deteriorated.

Still furthermore, the present invention provides a mercury adsorbent for adsorbing and removing metallic mercury from flue gas containing metallic mercury, $SO_2$, oxygen and water vapor, wherein a mercury removing agent, in particular, iodine or bromine or a compound thereof is supported on a surface of a carbon-based material and the carbon-based material is water repellent treated. In the mercury adsorbent of the present invention, by water repellent treatment, mercury adsorption capacity is inhibited from decreasing owing to water vapor or mist, by supporting iodine, bromine or a compound thereof, the mercury adsorption capacity is increased, and by promoting absorption of oxygen in the flue gas, a mercury adsorption region is maintained in an acidic atmosphere, and according to a comprehensive action thereof, the metallic mercury in the flue gas is efficiently adsorbed and removed.

A carbon-based material used in the mercury adsorbent of the present invention is preferably made of particulate activated carbon. In order to increase a surface area, the activated carbon is preferred to be fine. However, from the viewpoint of an increase in power and step for pulverizing finer, obviously, there is naturally a limit. Furthermore, there is also a disadvantage that excessively fine activated carbon is difficult to handle. This problem can be eliminated by pulverizing activated carbon to an average particle diameter from 20 to 200 µm followed by secondarily molding into a predetermined shape such as particle, pellet, sheet, honeycomb and the like. In this case, when an average particle diameter of individual activated carbon particles does not satisfy 20 µm, water vapor and sulfuric acid are retained between particles to disturb gas-liquid contact. On the other hand, when an average particle diameter exceeds 200 µm, a gas-liquid contact area becomes small to be incapable of increasing the activity.

The iodine or bromine compound used in the mercury adsorbent of the present invention is preferred to be any of alkali metal salts, alkaline earth metal salts, transition metal salts, hydrides, oxo acids and organic compounds of iodine or bromine. When iodine or bromine or a compound thereof (hereinafter, referred to as "iodine or the like") is supported on a surface of a carbon-based material, according to, for example, an ordinary method, a carbon-based material such as a pulverized activated carbon or the like may be immersed in an aqueous solution thereof or an organic solvent (alcohol and the like) solution, followed by drying. In this case, iodine or the like is supported on the carbon-based material in the form of ion exchange, physical adsorption or the like.

The iodine or the like is preferably supported in the range of 0.001 to 0.8 milligram atoms in terms of iodine or bromine per g of the carbon-based material. When 0.001 milligram atoms or less per g of the carbon-based material is supported, there is hardly an advantageous effect. On the other hand, when 0.8 milligram atoms or more is supported, the iodine or the like remarkably elutes into the solution.

The present inventors added, to 25 g of pulverized activated carbon (trade name: KURARAY COAL, average particle diameter: about 50 μm), 625 mL (liquid-solid ratio: 25 mL/g) of 20% sulfuric acid obtained by adding and dissolving a predetermined amount of potassium iodide, followed by stirring for 24 h under open air so as to induce oxygen absorption, and an iodine adsorption amount of the activated carbon was obtained from an iodide concentration remaining in the liquid. Results are shown in FIG. 9. It is found that, when the iodine adsorption amount is about 0.5 milligram atoms per g of the activated carbon, an iodine adsorption rate of the activated carbon reaches 90% or more, however, when the iodine adsorption amount is about 0.8 milligram atoms per g (at this time, the iodine added amount is about 1.5 milligram atoms per g of the activated carbon) of the activated carbon, an iodine adsorption rate of the activated carbon decreases to about 60%.

When the iodine adsorption amount further exceed 0.8 milligram atoms per g of the activated carbon, the iodine adsorption rate further decreases to result in a higher equilibrium concentration of iodine present in the liquid. As the result thereof, when provided to remove mercury, iodine detached from and contained in a generation liquid from the adsorbent or a circulation liquid increases and the iodine supporting amount of the activated carbon gradually decreases owing to detachment of the iodine; accordingly, even when the iodine supporting amount is much increased, an initial high supporting amount cannot be maintained. Also of the bromine, the same tendency as that of iodine can be found. From these points of view, a supporting amount of the iodine or the like should be limited to about 0.8 milligram atoms per g of the activated carbon.

Furthermore, the detachment of iodine into a circulation liquid is not preferable from the viewpoint of preventing iodine from releasing to the outside of the system. According to an experimental study of the present inventors, in the case where as the adsorbent, iodine of 0.13 milligram atoms per g of activated carbon was supported, iodine was hardly contained in the circulation liquid, on the other hand, when iodine of 0.8 milligram atoms per g of the activated carbon was supported, about 30 mg/L of iodine was contained in the circulation liquid. Accordingly, in order to assuredly inhibit external release of iodine, before the circulation liquid is supplied to the wet flue gas desulfurization apparatus, the circulation liquid may be brought into contact with activated carbon or an ion exchange resin to remove iodine. Also when waste water from the flue gas desulfurization apparatus is processed, iodine removal owing to activated carbon adsorption or ion exchange is effective. The removed iodine can be recovered and reused. When the iodine supporting amount further exceed 0.8 milligram atoms per g of the activated carbon, an iodine concentration in the circulation liquid showed tendency to increase exponentially.

In the water repellent treatment of a carbon-based material in the mercury adsorbent of the present invention, it is preferred that a resin having a contact angle with water of 90° or more is contained in the carbon-based material, or the carbon-based material is heated before supporting the iodine to remove hydrophilic groups on a surface thereof. Alternatively, these may be combined and applied to the water repellent treatment. Thus by conducting the water repellent treatment, an adsorbent having high desulfurization performance and capable of effectively removing mercury can be provided. When an iodide such as potassium iodide or the like is supported on the water repellent treated carbon-based material, at the time of supporting, an oxidizing agent such as hydrogen peroxide, hypochlorous acid or the like is added or air bubbling may be preferably conducted.

Further, according to the present invention, a flue gas treatment method is provided, in the method a flue gas containing metallic mercury, $SO_2$, oxygen and water vapor is brought into contact with a mercury adsorbent that supports iodine or bromine or a compound thereof (hereinafter, referred to as "iodine or the like") on a surface of a water-repellent treated carbon-based material with a wet state of the mercury adsorbent maintaining. Preferably, the flue gas may be allowed to flow into an adsorption tower packed with the mercury adsorbent. A packed layer may be a fixed bed or may be semi-continuously operated as fluidized bed. According to the method, the adsorbent removes mercury and exerts desulfurization effect; accordingly, load of the separately disposed flue gas desulfurization apparatus can be reduced to result in energy saving effect as a whole.

The flue gas is preferred to be an exit gas of the wet flue gas desulfurization apparatus. Divalent mercury and $SO_2$ in the flue gas are removed at the wet flue gas desulfurization apparatus; accordingly, metallic mercury adsorption capacity of the mercury adsorbent of the present invention can be effectively utilized. Although the exit gas of the wet flue gas desulfurization apparatus contains much water vapor, the mercury adsorbent of the present invention is water repellent treated; accordingly, the mercury adsorbent is difficult to wet and the mercury removal effect is not greatly damaged by water vapor. In addition, the surroundings of the mercury adsorbent are in a wet state; accordingly, also $SO_2$ gas remaining in the exit gas can be effectively removed. As a $SO_2$ gas absorption agent in the wet flue gas desulfurization apparatus, lime stone is generally used. However, without necessarily restricting thereto, other alkali agent such as sodium hydroxide or the like may be used. The mercury adsorbent of the present invention can exert the mercury removal effect even in a wet atmosphere; accordingly, without restricting only to the exit gas of the wet flue gas desulfurization apparatus, also when an exit gas of a washing tower is treated, the mercury adsorbent of the present invention can be preferably used.

It is preferred to spray industrial water or a dilute sulfuric acid solution to the mercury adsorbent to maintain a wet state and to feed an effluent flowing out of the mercury adsorbent to the flue wet gas desulfurization apparatus. At this time, air may be introduced in industrial water or a dilute sulfuric acid solution or an oxidant may be added thereto. In this case, it is preferred to sample a flue gas at each of an inlet and an outlet of an adsorption tower packed with the mercury adsorbent to measure a mercury concentration, and, when the mercury removal performance of the mercury adsorbent has become a predetermined value or less, an amount of air being introduced or the oxidizing agent being added is increased to recover the mercury removal performance of the mercury adsorbent. By adding iodine or the like to the industrial water or the dilute sulfuric acid solution, deteriorated mercury removal performance may be recovered or complemented.

A molar concentration of oxygen in the flue gas is preferred to be 10 times (molar ratio of oxygen and $SO_2$ is 10) or more a molar concentration of $SO_2$ gas. For example, when iodine is supported on activated carbon, the iodine oxidizes metallic mercury in the flue gas to fix as mercury iodide. When an existence ratio of $SO_2$ is larger than that of oxygen, a reducing atmosphere is generated, thereby, iodine stabilized by oxygen in the flue gas or generated mercury iodide is reduced to lower the mercury adsorption capacity, once adsorbed mercury is released, or iodine coexists in the circulation liquid of the adsorbent and is released outside of the system, and thereby secondary public hazard may be induced. Accordingly, an oxygen concentration and a $SO_2$ concentration in the flue gas are measured and air may be introduced into the flue gas so that a molar concentration of oxygen may be 10 times or more a molar concentration of $SO_2$. However, when an amount of the flue gas to be processed becomes larger by introducing air into the flue gas, the mercury removal rate may be deteriorated; accordingly, a molar ratio of oxygen and $SO_2$ is preferred to suppress to 5000 or less.

BRIEF DESCRIPTION OF THE DRAWINGS

FIG. 8 is a diagram illustrating conditions of water repellent treatment and desulfurization activity ratio of Examples 2, 9, 10 and 11 where a carbon-based catalyst of the present invention in a seventh Example is used.

BEST MODES FOR CARRYING OUT THE INVENTION

Figure 1:
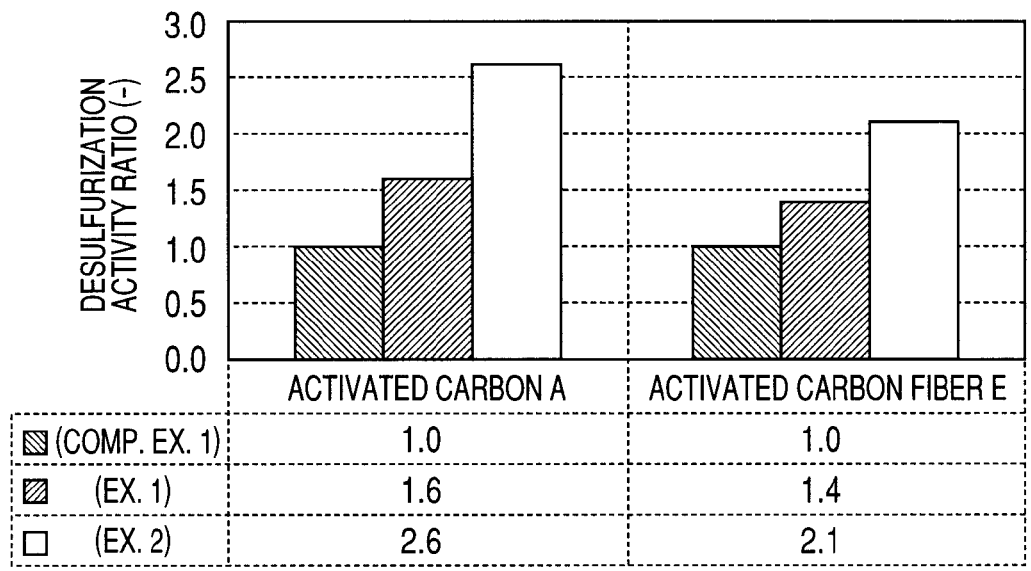
FIG. 1 is a graph illustrating results of a desulfurization test of Examples 1 and 2 where a carbon-based catalyst of the present invention in a first Example is used and of Comparative Example 1 where a conventional carbon-based catalyst is used.

Firstly, an embodiment of a carbon-based catalyst for flue gas desulfurization of the present invention will be described.

The carbon-based catalyst for flue gas desulfurization is obtained by finally forming into a shape such as a particulate, pellet-like or honeycomb-structured shape capable of passing flue gas containing $SO_2$ gas, oxygen and water vapor and dust accompanying the flue gas. As a carbon-based catalyst that is an actor thereof, a carbon raw material such as pyrolyzed carbon, fullerene soot or the like can be used. However, activated carbon or activated carbon fiber is particularly preferably used. Here, as the activated carbon, particulate activated carbon, fibrous activated carbon, activated carbon obtained by processing cokes as a raw material and the like are preferred. Furthermore, also the activated carbon of which desulfurization activity is heightened by heat treatment can be used.

A surface of the carbon-based catalyst is water repellent treated with a water repellent resin such as fluororesins such as polytetrafluoroethylene and the like, polypropylene resins, polyethylene resins, polystyrene resins or the like, of which contact angle with water is 90° or more. Furthermore, on a surface of the carbon-based catalyst, iodine, bromine or a compound thereof is added, ion exchanged or supported. An added, ion exchanged or supported amount of the iodine or compound thereof to the carbon-based catalyst is preferably in the range of 0.020% by weight or more and 60% by weight or less as iodine. Furthermore, an added, ion exchanged or supported amount of the bromine or a compound thereof to the carbon-based catalyst is preferably in the range of 0.010% by weight or more and 60% by weight or less as bromine. Still furthermore, as will be described below, a more preferable added, ion exchanged or supported amount of iodine, bromine or a compound thereof to the carbon-based catalyst is in the range of 0.1% by weight to 10% by weight as iodine or bromine, and most preferable to be in the range of 0.1% by weight to 5% by weight.

As the compounds of iodine or bromine, any of alkali metal salts, alkali earth metal salts, transition metal salts, hydrides, oxo acids and organic compounds of iodine or bromine can be applied. More specifically, as the iodide, iodides such as lead iodide, nickel iodide, magnesium iodide, iron iodide, phosphorus iodide and the like, alkyl halides such as iodic acid and iodates, methyl iodide, ethyl iodide, propyl iodide and the like, allyl iodides, methylene iodides and the like can be used. Furthermore, as the bromine compounds, bromides such as phosphorous bromide, iodine bromide, magnesium bromide, iron bromide and the like, alkyl halides such as bromic acid and bromine salts, methyl bromide, ethyl bromide and the like, allyl bromides, methylene bromides, ethylene bromides and the like can be used.

In the next place, an embodiment of a method of producing the carbon-based catalyst for flue gas desulfurization will be described. Firstly, after, as a pretreatment, the carbon-based catalyst is water repellent treated and molded into a predetermined shape, the carbon-based catalyst is immersed in an aqueous solution such as water or the like to wet the inside of pores of the carbon-based catalyst and fill with the aqueous solution. Then, steps of adding, ion exchanging or carrying iodine or bromine are conducted. An order of conducting these three steps can be appropriately selected.

In the first place, as a material for conducting a water repellent treatment to the carbon-based catalyst, a water repellent resin having a contact angle to water of 90° or more is used. Specifically, resins such as polystyrene, polyethylene, polypropylene and the like and fluororesins such as polychlorotrifluoroethylene, polytrifluoroethylene, polytetrafluoroethylene and the like can be cited.

As a method of applying the water repellent treatment on a surface of the carbon-based catalyst, a method where the carbon-based catalyst and a dispersion or powder of a water repellent resin such as a fluororesin or the like are mixed, a method where the carbon-based catalyst and a water repellent resin are kneaded under a shearing force to add or carry the water repellent resin on a surface of the carbon-based catalyst, and the like can be used. Furthermore, in particular in the case of the fluororesin, when a shearing force is applied, the fluororesin is made fibrous on a surface of the carbon-based catalyst and the fibers pile on to form a network; accordingly, without completely covering a catalyst surface with the fluororesin, a water repellent treatment can be imparted with a little amount of fluororesin.

In the next place, in the molding step, a carbon-based catalyst and a general organic binder (thermoplastic resin, thermosetting resin and the like) are kneaded, followed by pressure molding, and thereby the particulate, pellet-like or honeycomb structure can be readily molded. At this time, when a water repellent resin such as the fluororesin, polypropylene resin, polyethylene resin, polystyrene resin or the like or a binder mixed with an acid-resistant resin including these is used, the water repellent treatment can be simultaneously conducted. Furthermore, when a core material sheet containing the acid resistant resin, non-woven fabric or the like is added, also raw material saving of the carbon-based catalyst and an improvement in strength can be achieved.

Furthermore, when the inside of the carbon-based catalyst undergone the molding step is clogged with the water, reduced pressure impregnation or steam addition can be preferably used. According to the reduced pressure impregnation, the carbon-based catalyst is poured into a vessel, followed by pouring water, further followed by, with the inside of the vessel controlling at a predetermined temperature, evacuating air of the inside by an exhaust pump to reduce pressure to 0.05 atm or less, followed by holding this state for a certain time period, further followed by returning pressure of the inside of the vessel to atmospheric pressure. On the other hand, according to the steam addition, the carbon-based catalyst is exposed in a mixed gas where water vapor is mixed with air to fill the inside of pores. At this time, the higher the water vapor pressure in air is, the better. It is preferred that when water vapor of, for example, 135° C. was mixed with air and a temperature came to 100° C., an amount of water vapor and an amount of air are controlled so that water vapor in the mixed gas may condense.

Furthermore, as a method that is a next step where on a surface of the carbon-based catalyst, iodine or a compound thereof is added or carried, a method where iodine or a compound thereof is dissolved/dispersed in a hydrophilic solvent (for example, water and alcohols) and sprayed, sprinkled, impregnated or immersed to the carbon-based catalyst and a method where iodine or a compound thereof in the form of a particulate or a solution thereof is kneaded with the carbon-based catalyst can be applied. Still furthermore, as a method of adding or carrying bromine or a compound thereof, similarly, a method where these are dissolved/dispersed in a hydrophilic solvent and sprayed to the carbon-based catalyst and also a method where gaseous bromine is brought into contact with the carbon-based catalyst can be applied.

A mercury adsorbent of the present invention has a carbon-based material as a base and carries on a surface thereof iodine ($I_2$) or bromine ($Br_2$) or a compound thereof (hereinafter, referred to as "iodine or the like"), the carbon-based material being water repellent treated. As a carbon-based material usable in the present invention, activated carbon, carbon fiber, carbon black, graphite and the like can be cited. However, when considering support of iodine or the like and a water repellent treatment, activated carbon is preferred. There are various kinds of activated carbon depending on raw materials and shapes and all of these can be preferably used. However, particulate activated carbons such as coal-based activated carbon, coconut shell-based activated carbon and the like are too large in particle diameter as they are, cannot make an effective contact area with flue gas larger and are difficult to conduct the water repellent treatment; accordingly, it is preferred to pulverize to an average particle diameter (50% passing diameter) of 20 to 200 µm and use.

In order to support iodine or the like on a carbon-based material such as activated carbon or the like, a solution where iodine or the like is dissolved in water or a volatile organic solvent such as alcohol or the like is impregnated, and the solvent may be volatilized. As iodine or the like supported by a carbon-based material, simple substances such as $I_2$, $Br_2$ and the like, alkali metal salts such as KI, KBr, NaI, NaBr and the like, alkaline earth metal salts such as $CaI_2$, $CaBr_2$, $MgI_2$, $MgBr_2$ and the like, transition metal salts such as lead iodide, nickel iodide, iron iodide, iron bromide and the like, hydrides such as HI, HBr and the like, oxo acids and salts thereof such as iodic acid, bromic acid and the like, organic compounds such as methyl iodide, allyl iodide methylene iodide, ethyl bromide, allyl bromide and the like, and phosphorous bromide, iodine bromide and the like can be used. Preferably, a carbon-based material is impregnated with an aqueous solution of KI, KBr or the like, or an alkali metal salt of iodine or bromine under an oxygen atmosphere. In order to impregnate the carbon-based material with a solution of iodine or the like, the carbon-based material is dipped in the solution or the solution may be sprayed to the carbon-based material. However, the carbon-based material is generally water repellent to some extent; accordingly, when water or a hydrophilic organic solvent is used as a solvent, in some cases, it takes a long time to impregnate the solution. In such a case, reduced pressure impregnation can be used to shorten the impregnation.

When a water repellent treatment is applied to the carbon-based material, a water repellent resin and a carbon-based material may be thoroughly mixed, followed by kneading with a kneader or the like. As a water repellent resin, a resin having a contact angle with water of 90° or more is preferred. As such resin, fluororesins such as polytetrafluoroethylene, polychlorotrifluoroethylene, polytrifluoroethylene and the like are most preferred. However, also other resins such as polypropylene, polyethylene, polystyrene and the like can be used. In this case, use of a dispersion liquid in the form where a particulate resin is dispersed in water is preferred because when such a dispersion liquid is used, the particulate resin can be readily mixed with a carbon-based material also in the particulate form, and after mixing, it is easy to knead with a kneader or the like. In the case where a fluororesin is used, not only the water repellent resin is simply mixed with the carbon-based material but also particularly preferably a kneading operation is followed. This is because a particulate resin is deformed under a shearing force, extended in fiber to cover a surface of the carbon-based material, and, thereby, with surface activity of the carbon-based material remaining, very large water repellent effect can be obtained.

Alternatively, a water repellent treatment can be conducted also by heating the carbon-based material to remove hydrophilic groups on a surface thereof. When iodine or the like is supported by a carbon-based material, followed by heating at high temperatures, supported iodine or the like may be volatilized; accordingly, it is preferred that, after the heat treatment, iodine or the like is supported. Alternatively, when, after iodine or the like is supported, heat treatment is conducted, the heat treatment is preferably conducted at a relatively low temperature.

Although a carbon-based material by which iodine or the like is supported and to which a water repellent treatment is applied can be used as a particulate adsorbent, preferably, in order to fill in a flue gas treatment mercury adsorption tower, the carbon-based material is molded into particles, pellets, honeycombs and the like more large in size. Since a carbon-based material mixed, kneaded with a water repellent resin has a plastic block form, as it is, or, as required, after a binder is further added thereto, it can be pressure molded into a plane table by a roll or the like. When a part of the resulted tabular molded bodies is corrugated, followed by alternately laminating with a tabular molded body, a honeycomb-shaped molded body can be prepared. On the other hand, in the case of particulate form, an appropriate binder may be added followed by molding in pellet, or, in a manner similar to the case of block shape, may be formed in honeycomb.

In the next place, an embodiment of a mercury adsorbent for flue gas treatment involving the present invention will be described.

Figure 10:
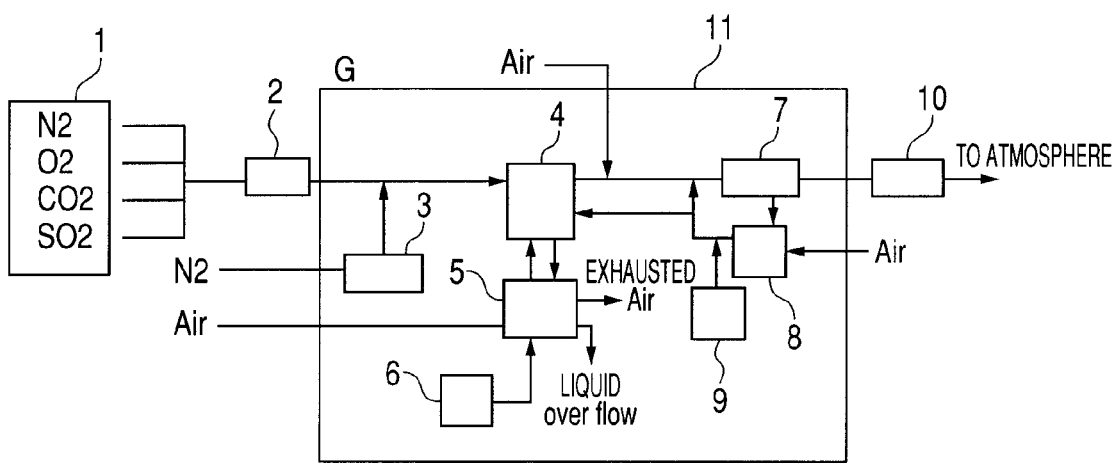
FIG. 10 is a diagram illustrating an example of test units for conducting a flue gas treatment process that uses a mercury adsorbent of the present invention.

When a mercury adsorbent of the present invention is used to remove metallic mercury in flue gas, an experimental unit illustrated in, for example, FIG. 10 may be used. In FIG. 10, a mixed gas made of nitrogen, oxygen, carbon dioxide gas and $SO_2$ gas is fed from a gas feeder 1, heated and humidified with hot water at a gas heating and humidifying section 2, followed by adding mercury vapor generated by bringing nitrogen gas into contact with metallic mercury at a mercury generation section 3, thereby simulated flue gas is formed. The resulted simulated flue gas comes into contact with an absorption liquid at a gas-liquid contact section 4 and, at this time, about 70 to 90% of $SO_2$ in the simulated flue gas is absorbed and removed. The gas-liquid contact section 4 corresponds to a $SO_2$ gas absorption portion of a wet flue gas desulfurization apparatus. Industrially, lime stone is used as $SO_2$ gas adsorbent. However, in the case of the experimental units, in place of lime stone, an appropriate alkali agent may be used. An absorption liquid that comes into contact with simulated flue gas at the gas-liquid contact section 4 circulates between with an absorption liquid oxidation section 5, at the absorption liquid oxidation portion, an oxidation-reduction potential (ORP) is controlled by air exposure, and pH is controlled by acid and alkali added from a liquid feed section for pH control 6.

In the exit gas diffused from the gas-liquid contact section 4, metallic mercury resistant to absorption in an absorption liquid is contained, and, this is adsorbed and removed when the gas goes past an adsorption tower 7 packed with a mercury adsorbent of the present invention. When a mercury adsorbent is based on activated carbon, the activated carbon initially has a large specific surface area and effectively works as a contact interface with the gas. The mercury adsorbent of the present invention is water repellent treated; accordingly, even in a wet state, a water film does not inhibit the mercury adsorbent from coming into contact with gas or pores are less clogged. Furthermore, iodine or the like is supported on a surface thereof; accordingly, mercury capturing capacity is higher than that of untreated activated carbon. These factors work in a mixed way; accordingly, the mercury adsorbent of the present invention (in particular, activated carbon base) has large mercury adsorption capacity and a removal rate of mercury in the gas is high. The mercury removal rate can be obtained by measuring a mercury concentration at an inlet and an outlet of the adsorption tower.

Now, in the flue gas, a part of $SO_2$ gas remained without absorbing at the gas-liquid contact portion is contained. However, when the mercury adsorbent of the present invention is maintained in a wet state, while the flue gas goes past the adsorption tower 7, $SO_2$ gas is oxidized on a surface of the adsorbent to sulfuric acid by oxygen in the flue gas and removed. $SO_2$ removed thus from the flue gas becomes sulfuric acid, flows down on a surface of the adsorbent and accumulates at a liquid recovery section for a fixed bed 8. A liquid accumulated at the liquid recovery section for a fixed bed is usually a dilute sulfuric acid solution where sulfuric acid dropped from an adsorbent fixed bed is mixed in industrial water, a part thereof is circulated to an upper portion of the adsorption tower 7 and again sprayed to the mercury adsorbent, the other part thereof is transferred to the gas-liquid contact section to neutralize sulfuric acid, and mercury is treated together with oxidized mercury captured at a flue gas desulfurization apparatus at a waste water treatment apparatus and the like. In the liquid recovery section for a fixed bed 8, in the case where ORP of a liquid sprayed to the mercury adsorbent is heightened to improve the removal rate, as required, air may be introduced, or, various kinds of additives such as an oxidizing agent and the like can be added from an additive liquid feed section 9. When a liquid amount is scarce, water may be replenished to a liquid recovery section.

Thus, when a flue gas desulfurization apparatus efficient as a removal method of $SO_2$ is disposed as a former step of a mercury removal apparatus packed with a mercury adsorbent of the present invention, according to a combination thereof, $SO_2$ and mercury can be efficiently removed. In particular, in a mercury removal apparatus, unaffectedly by $SO_2$ gas, mercury can be removed, and also remaining $SO_2$ can be removed.

$SO_2$ gas and mercury are hardly contained in the flue gas diffused from the adsorption tower 7. However, an apparatus of FIG. 10 is an experimental units and, as a Comparative Example, experiments may be conducted under various conditions, thereby, mercury may be contained in the flue gas after treatment; accordingly, a exhaust gas treatment section 10 is disposed so as not to diffuse the flue gas as it is. A mercury generation section 3, a gas-liquid contact section 4, an absorption liquid oxidation section 5, a liquid feed section for pH control 6, an adsorption tower 7, a liquid recovery section for a fixed bed 8 and an additive liquid feed section 9 are housed in a thermostatic chamber 11.

[Example of Carbon-Based Catalyst for Flue Gas Desulfurization]

As a carbon-based catalyst to be a base, following three kinds of commercially available particulate activated carbons and two kinds of activated carbon fibers, which are the substantially same in iodine adsorption amount were prepared.

|  | Raw materials | Iodine adsorption amount (mg/g) |
| --- | --- | --- |
| Activated carbon A | Coal-based | 1220 |
| Activated carbon B | Coconut shell-based | 1100 |
| Activated carbon C | Charcoal-based | 1180 |
| Activated carbon fiber E | Pitch-based | 1250 |
| Activated carbon fiber F | PAN-based | 1130 |

Comparative Example 1

Firstly, as carbon-based catalysts for flue gas desulfurization of Comparative Example 1 to be compared with following Examples 1, 2, 3, 4 and 8, the activated carbons A to C and activated carbon fibers E and F were only water repellent treated to produce carbon-based catalysts for flue gas desulfurization. That is, to 90 parts by weight of activated carbons A to C pulverized to an average particle diameter of 20 to 200 μm and activated carbon fibers E and F cut to 3 mm or less, an aqueous dispersion of polytetrafluoroethylene (manufactured by Daikin Industries Ltd., resinous solid content: 60% by weight) was mixed so as to be 10 parts by weight by solid concentration, followed by kneading with a pressure kneader, further followed by preparing tabular sheets having a thickness of 0.8 mm by a roll. Then, the half of the tabular sheets was corrugated with a gear-shaped roll, followed by alternately laminating with the tabular sheet, thereby a honeycomb carbon-based catalyst for flue gas desulfurization was obtained.

Then, 0.001 m³ of the resulted honeycomb shaped activated carbon catalyst for flue gas desulfurization was packed in a 50 mm×50 mm square catalyst packing tower, to the catalyst layer, simulated flue gas at a temperature of 50° C. containing 1000 volume ppm of $SO_2$, 5% by volume of oxygen, 10% by volume of carbon dioxide and having humidity of 80% was passed at 1 m³/h, thereby, desulfurization performance of each of carbon-based catalyst for flue gas desulfurization was obtained. According to an evaluation method of the desulfurization performance, a linear reaction was assumed to $SO_2$ gas concentration in the flue gas and an apparent velocity constant $K_0$ was calculated by a following equation.

$$K_0 = -(\text{amount of gas/amount of catalyst}) \times Ln(1-\text{desulfurization rate})$$

$$\text{Desulfurization rate} = 1 - (\text{exit } SO_2 \text{ gas concentration/inlet } SO_2 \text{ gas concentration})$$

The desulfurization performance obtained under the present condition was taken as a reference value (=desulfurization activity ratio 1.0).

First Example

Example 1

As a carbon-based catalyst for flue gas desulfurization involving Example 1, carbon-based catalysts for flue gas desulfurization involving the present invention were produced in such a manner that the activated carbon A and activated carbon fiber E were used to support KI that is an iodide and water repellent treated.

Firstly, activated carbon A pulverized to an average particle diameter of 20 to 200 μm and activated carbon fiber E cut to 3 mm or less were impregnated under reduced pressure with an aqueous solution of KI to support. At this time, a supported amount of KI was dissolved to prepare a supporting amount. In the next place, to 90 parts by weight of KI-supported activated carbon C and activated carbon fiber E, an aqueous dispersion of polytetrafluoroethylene (manufactured by Daikin Industries Ltd., resinous solid content: 60% by weight) was mixed so as to be 10 parts by weight by solid concentration, followed by kneading with a pressure kneader, further followed by preparing tabular sheets having a thickness of 0.8 mm by a roll. Then, from the tabular sheets, in a manner similar to that of the Comparative Example 1, honeycomb shaped activated carbon catalysts for flue gas desulfurization that support KI by 5% by weight of iodine were obtained.

The impregnation under reduced pressure will be specifically described. In the beginning, activated carbon A was poured in a pressure reduction vessel, followed by pouring water of about 5 times by volume to a volume of the activated carbon. Then, with a temperature inside of the container controlling so as to be constant at 25° C., air in the container was evacuated by an exhaust pump to 0.05 atm or less. Then, the state was maintained for about 12 h, followed by returning pressure inside of the container to atmospheric pressure (1 atm).

In the next place, a desulfurization test was conducted to the resulted honeycomb shaped activated carbon catalyst for flue gas desulfurization under the test condition the same as that of Comparative Example 1 to obtain desulfurization performance.

Example 2

As a carbon-based catalyst for flue gas desulfurization involving Example 2, carbon-based catalysts for flue gas desulfurization involving the present invention were produced in such a manner that with the activated carbon A and activated carbon fiber E, the inside of pores thereof were previously impregnated with water, followed by supporting KI that is an iodide and by water repellent treating.

Firstly, activated carbon A pulverized to an average particle diameter of 20 to 200 μm and activated carbon fiber E cut to 3 mm or less were impregnated with water according to the impregnation under reduced pressure. Then, the activated carbon was impregnated under reduced pressure with an aqueous solution of KI to support. At this time, a supporting amount of KI was dissolved to prepare a supported amount. In the next place, to 90 parts by weight of KI-supported activated carbon A and activated carbon fiber E, an aqueous dispersion of polytetrafluoroethylene (manufactured by Daikin Industries Ltd., resinous solid content: 60% by weight) was mixed so as to be 10 parts by weight by solid concentration, followed by kneading with a pressure kneader, further followed by preparing tabular sheets having a thickness of 0.8 mm by a roll. Then, from the tabular sheets, in a manner similar to that of the Comparative Example 1, honeycomb shaped activated carbon catalysts for flue gas desulfurization that support KI by 5% by weight of iodine were obtained.

In the next place, a desulfurization test was conducted to the resulted honeycomb shaped activated carbon catalyst for flue gas desulfurization under the test condition the same as the activated carbon catalysts for flue gas desulfurization illustrated in Comparative Example 1 and Example 1 to obtain desulfurization performance.

FIG. 1 illustrates desulfurization activity ratios by comparing carbon-based catalysts for flue gas desulfurization illustrated in the Example 1 and Example 2 and a carbon-based catalyst for flue gas desulfurization of Comparative Example 1. From the drawing, it was found that a catalyst of Example 1 where water repellent treatment was applied to the activated carbon and the like and an iodide KI was supported can obtain desulfurization performance about 1.5 times higher than Comparative Example 1 where activated carbon and activated carbon fiber were only water repellent treated, and a catalyst of Example 2 where the inside of pores of the activated carbon and the like was previously clogged with water can obtain further higher desulfurization performance of about 2 to 2.5 times or more.

Second Example

In order to verify whether an improvement effect in desulfurization performance is different or not between a case where iodine or a compound thereof is supported by the activated carbon or the like and a case where bromine or a compound thereof is supported, activated carbon catalysts for flue gas desulfurization of following Example 3 and Example 4 were used to verify.

Example 3

In the first place, as activated carbon catalysts for flue gas desulfurization of Example 3, honeycomb shaped activated carbon catalysts for flue gas desulfurization involving the present invention and supporting KI by 5% by weight as iodine were produced in such a manner that with the activated carbons A to C and activated carbon fibers E and F, in a manner similar to that of Example 2, the inside of pores thereof were previously impregnated with water, followed by supporting KI that is an iodide and by conducting a water repellent treatment.

Example 4

Furthermore, similarly, as a c activated carbon catalyst for flue gas desulfurization of Example 4, honeycomb shaped activated carbon catalysts for flue gas desulfurization involving the present invention and supporting KBr by 5% by weight as bromine were produced in such a manner that with the activated carbons A to C and activated carbon fibers E and F, in a manner similar to a production method of Example 2, the inside of pores thereof were previously impregnated with water, followed by supporting KBr that is a bromine compound and by conducting a water repellent treatment.

Then, a desulfurization test was conducted to the resulted honeycomb shaped activated carbon catalyst for flue gas desulfurization of the Example 3 and Example 4 under the test conditions the same as the Comparative Example 1 to obtain desulfurization performance thereof.

Figure 2:
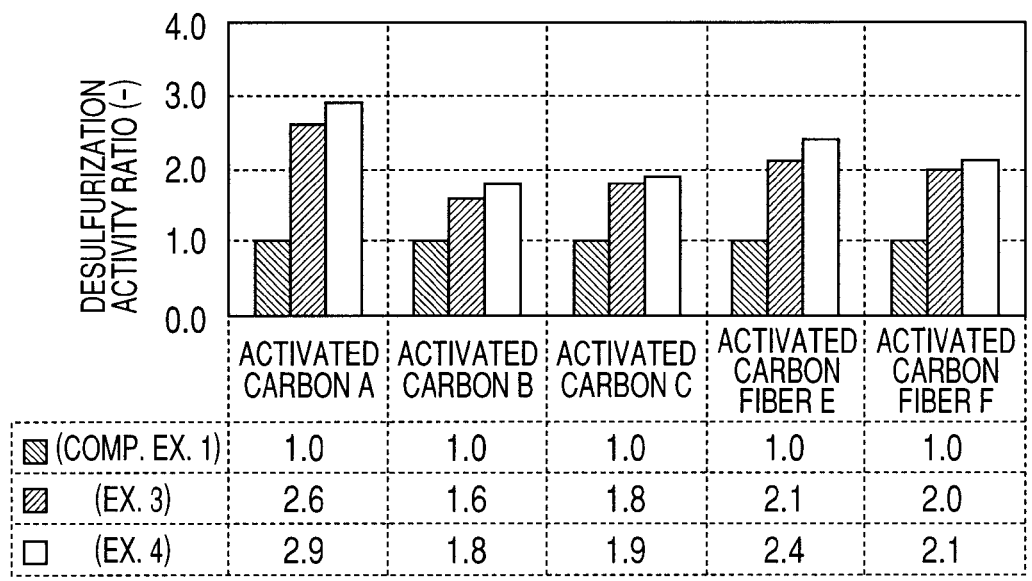
FIG. 2 is a graph illustrating results of a desulfurization test of Examples 3 ad 4 where a carbon-based catalyst of the present invention in a second Example is used and of Comparative Example 1 where a conventional carbon-based catalyst is used.

FIG. 2 illustrates desulfurization activity ratios by comparing carbon-based catalysts for flue gas desulfurization illustrated in the Example 3 and Example 4 and a carbon-based catalyst for flue gas desulfurization of Comparative Example 1, which were obtained as the result of the desulfurization test. From the drawing, it was found that both a catalyst on which an iodide KI was supported and a catalyst on which a bromine compound KBr was supported show an improvement in the desulfurization effect substantially the same as Comparative Example 1.

Third Example

In the next place, how a supported amount of iodine, bromine or a compound thereof relative to activated carbon affects an improvement in desulfurization performance was verified with activated carbon catalysts for flue gas desulfurization of Example 5 and Example 6 described below.

Example 5

Firstly, as an activated carbon catalyst for flue gas desulfurization of Example 5, 20 kinds of honeycomb shaped activated carbon catalysts for flue gas desulfurization involving the present invention were produced in such a manner that with the activated carbon A, according to a production method similar to Example 2, the inside of pores thereof was previously impregnated with water, followed by supporting iodine in the range of 0.01% by weight to 80% by weight by varying an amount of KI that is an iodide and by conducting a water repellent treatment.

Example 6

Furthermore, similarly, as an activated carbon catalyst for flue gas desulfurization of Example 6, 5 kinds of honeycomb shaped activated carbon catalysts for flue gas desulfurization involving the present invention were produced in such a manner that with the activated carbon A, according to a production method similar to Example 2, the inside of pores thereof was previously impregnated with water, followed by supporting bromine in the range of 0.01% by weight to 80% by weight by varying an amount of KBr that is a bromine compound and by conducting a water repellent treatment.

Then, a desulfurization test was conducted to a plurality of honeycomb shaped activated carbon catalysts for flue gas desulfurization of Example 5 and Example 6 under the test condition the same as that of the Comparative Example 1 to obtain desulfurization performance thereof.

Figure 3:
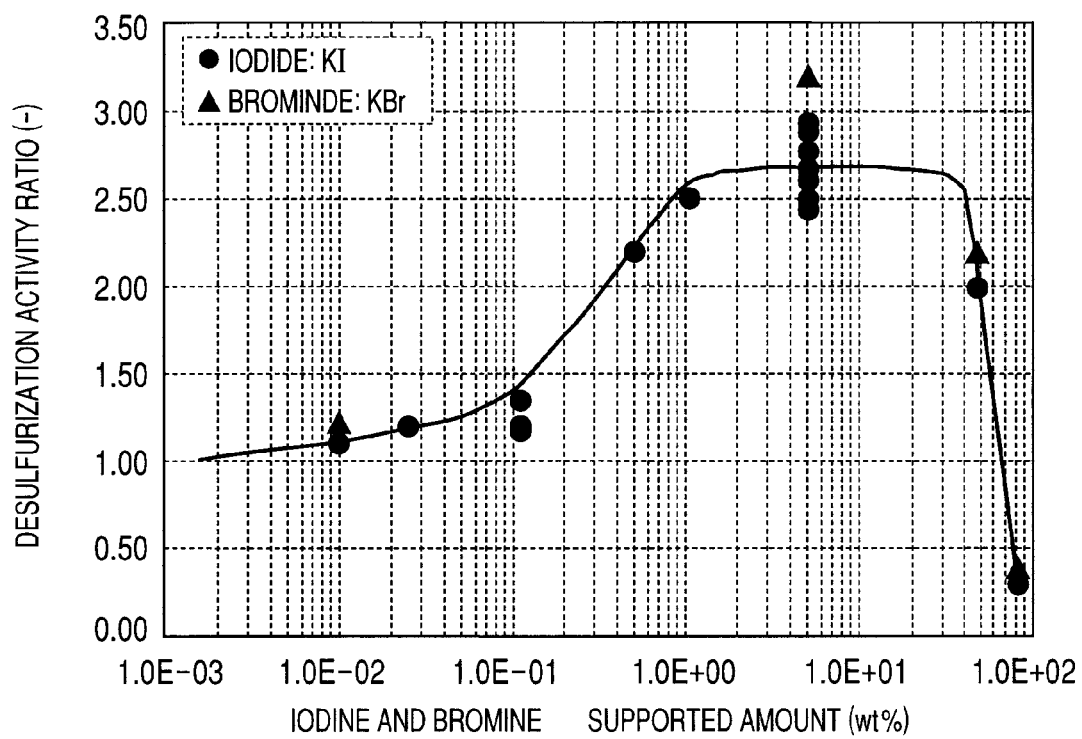
FIG. 3 is a graph illustrating results of a desulfurization test of Examples 5 and 6 where a carbon-based catalyst of the present invention in a third Example is used.

FIG. 3 illustrates results of desulfurization test in a plurality of catalysts obtained by varying a supporting amount of KI or KBr of the Example 5 and Example 6. From the drawing, it is found that both iodine and bromine can obtain substantially the same improvement effect in desulfurization performance to the respective supported amount, and, by supporting an iodide KI in the range of 0.020% by weight to 60% by weight as iodine or by supporting a bromine compound KBr in the range of 0.010% by weight to 60% by weight as bromine, an improvement effect of the desulfurization performance can be obtained.

Here, when a supported amount of iodine, bromine or a compound thereof in activated carbon A exceeds 10% by weight as iodine or bromine, a desired advantage can be obtained. However, an improvement effect proportional to an increase in the supported amount cannot be obtained. On the other hand, when the supported amount does not satisfy 0.1% by weight, the advantage decreases relatively rapidly. Furthermore, in the range of 5% by weight to 10% by weight in particular, an improvement rate of advantage is not said to be large to an increase rate of the supported amount. Accordingly, it is found that a more preferable added, ion exchanged or supported amount of iodine, bromine or a compound thereof to the carbon-based catalyst is in the range of 0.1% by weight to 10% by weight and most preferably in the range of 0.1% by weight to 5% by weight.

Fourth Example

In the next place, activated carbon catalysts for flue gas desulfurization described in Example 7 below were used to verify, in the case where an iodide is supported by the activated carbon or the like, whether difference of improvement effect in the desulfurization performance is generated or not depending on the difference of the iodide.

Example 7

As an activated carbon catalyst for flue gas desulfurization of Example 7, a plurality of honeycomb shaped activated carbon catalysts for flue gas desulfurization involving the present invention were produced in such a manner that with the activated carbon A, in a manner similar to Example 2, the inside of pores thereof was previously impregnated with water, followed by supporting KI, $MgI_2$, $AlI_3$ or CuI that is an iodide respectively by 0.5% by weight and by conducting a water repellent treatment.

Then, a desulfurization test was conducted to the resulted plurality of honeycomb shaped activated carbon catalysts for flue gas desulfurization supporting different iodide under the test condition the same as that of the Comparative Example 1 to obtain desulfurization performance thereof.

Figure 4:
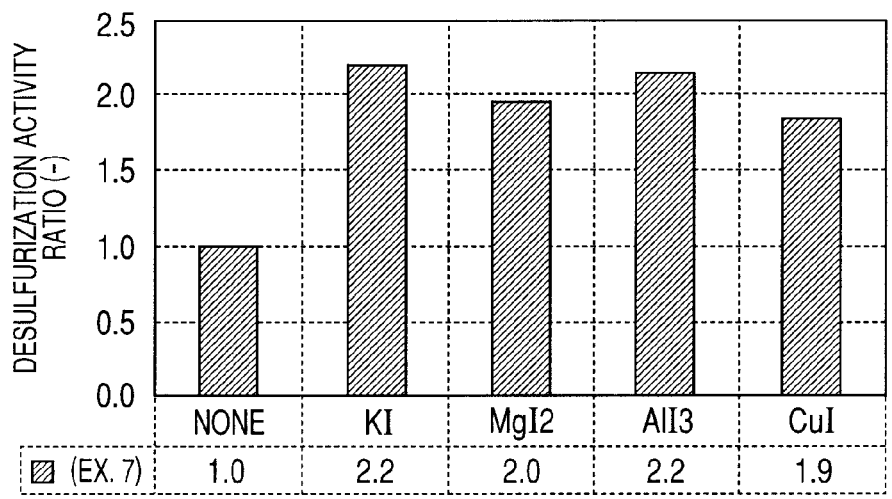
FIG. 4 is a graph illustrating results of a desulfurization test of Example 7 where a carbon-based catalyst of the present invention in a fourth Example is used.

FIG. 4 illustrates the test results thereof. From FIG. 4, it is found that also in the case where iodide are different, to Comparative Example 1 that does not support these, excellent improvement effect of desulfurization performance can be obtained, and, according to the difference of the compound, large difference in the improvement effect is not generated.

Fifth Example

In the next place, an activated carbon catalyst for flue gas desulfurization of Example 8 below was used to verify how long the activated carbon catalyst for flue gas desulfurization involving the present invention can maintain the desulfurization performance.

Example 8

As an activated carbon catalyst for flue gas desulfurization of Example 8, a honeycomb shaped activated carbon catalyst for flue gas desulfurization involving the present invention was produced in such a manner that with the activated carbon A, in a manner similar to Example 2, the inside of pores thereof was previously impregnated with water, followed by supporting KI that is an iodide by 0.5% by weight as iodine and by conducting a water repellent treatment. Then, under test conditions similar to the Comparative Example 1, the desulfurization test was conducted over a long term.

Figure 5:
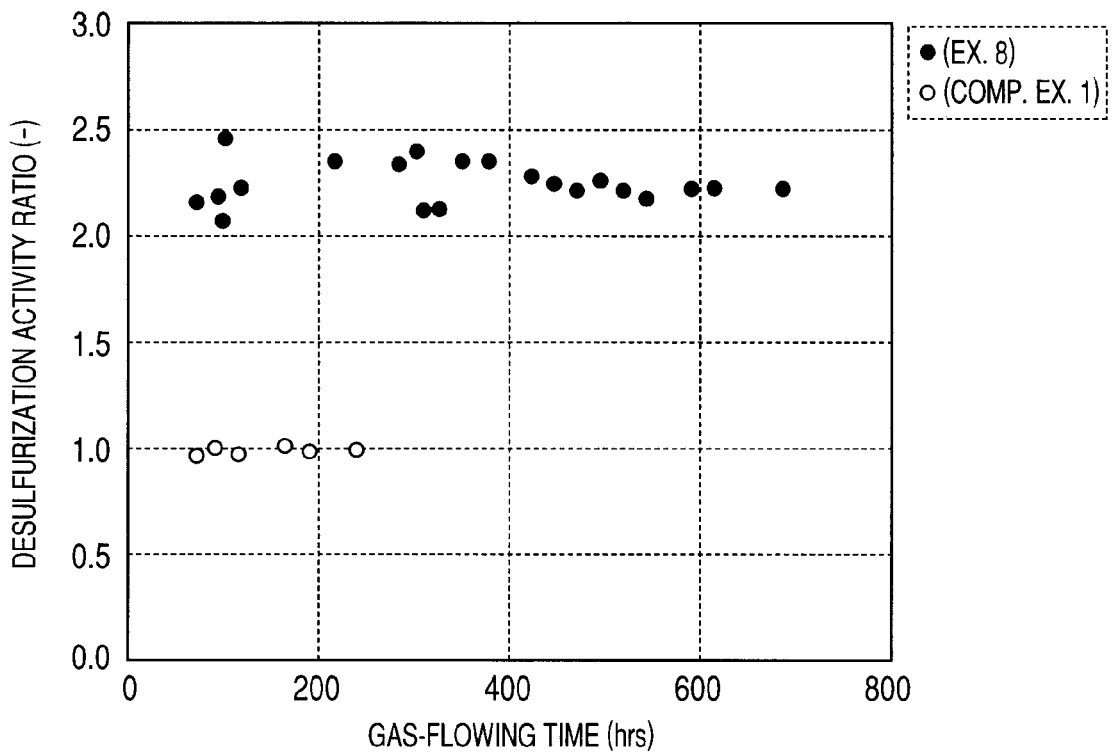
FIG. 5 is a graph illustrating results of a long term desulfurization test of Example 8 where a carbon-based catalyst of the present invention in a fifth Example is used and of Comparative Example 1 where a conventional carbon-based catalyst is used.

FIG. 5 illustrates the test results. From FIG. 5, it is found that according to the activated carbon catalyst for flue gas desulfurization of the present invention, up to at least 700 h, more than 2 times the desulfurization performance of Comparative Example 1 can be maintained.

Sixth Example

In the next place, the carbon-based catalyst for flue gas desulfurization involving the present invention obtained in such a manner that to the activated carbon or the like, after the inside of pores thereof is previously impregnated with water, iodine or the like is supported and water repellent treatment is applied was verified to exhibit more remarkable desulfurization performance to activated carbon that uses a resin low in the water repellency as a binder, a catalyst obtained by simply supporting iodine on activated carbon, and a catalyst obtained by simply conducting a water repellent treatment to activated carbon.

Comparative Example 2

Firstly, as a carbon-based catalyst for flue gas desulfurization involving Comparative Example 2, a honeycomb shaped activated carbon catalyst for flue gas desulfurization was obtained in such a manner that to 90 parts by weight of activated carbon A pulverized to an average particle diameter of 20 to 200 μm, an amide resin as a molding aid was mixed so as to be 10 parts by weight, followed by kneading with a pressure kneader, further followed by preparing tabular sheets having a thickness of 0.8 mm by a heat roll, a half of the tabular sheets was corrugated by a gear-like roll, further followed by alternately laminating with the other tabular sheet.

Comparative Example 3

Furthermore, a carbon-based catalyst for flue gas desulfurization involving Comparative Example 3 was prepared in such a manner that activated carbon A pulverized to an average particle diameter of 20 to 200 μm was impregnated with water under reduced pressure to fill the inside of pores of the activated carbon A with water, followed by impregnating an aqueous solution of KI under reduced pressure to support. At this time, a supporting amount of KI was dissolved to prepare a supported amount. Then, to 90 parts by weight of activated carbon A that supports KI, an amide resin as a molding aid was mixed so as to be 10 parts by weight, followed by kneading with a pressure kneader. From the kneaded matter, tabular sheets having a thickness of 0.8 mm were formed by a heat roll, with the tabular sheets, in a manner similar to the Comparative Example 2, a honeycomb shaped activated carbon catalyst for flue gas desulfurization that supports KI by 5% by weight as iodine was obtained.

Then, to activated carbon catalysts for flue gas desulfurization of Comparative Example 2 and Comparative Example 3, under the same conditions as that of the Comparative Example 1, desulfurization test was conducted to obtain the desulfurization performance thereof.

Figure 6:
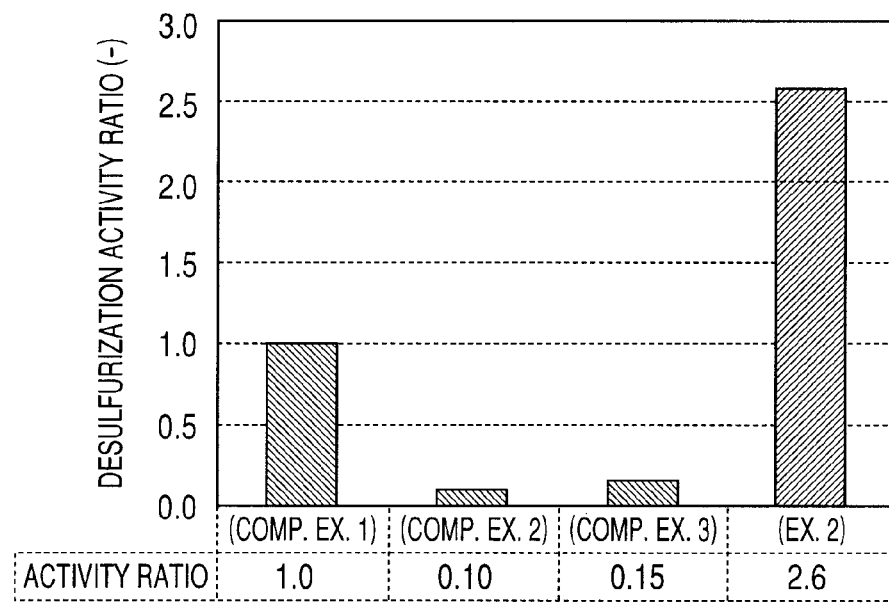
FIG. 6 is a graph illustrating results of a desulfurization test of Example 2 where a carbon-based catalyst of the present invention in a sixth Example is used and of Comparative Examples 1, 2 and 3 where a conventional carbon-based catalyst is used.

FIG. 6 illustrates by comparing desulfurization activity ratios of carbon-based catalysts for flue gas desulfurization illustrated in the Comparative Example 2 and Comparative Example 3 and carbon-based catalysts for flue gas desulfurization illustrated in the Comparative Example 1 and Example 2. From the drawing, it was found that to a catalyst of Comparative Example 2 where iodine was not supported and the water repellent treatment was not applied, a catalyst of Comparative Example 3 where the water repellent treatment was not applied but the inside of pores was clogged with water and an iodide KI was supported exhibited an improvement in desulfurization performance of about 1.5 times, and a catalyst of Comparative Example 1 where only water repellent treatment was applied only exhibited an improvement effect in desulfurization performance of about 10 times.

By contrast, an activated carbon catalyst for flue gas desulfurization of Example 2 involving the present invention where after water was previously impregnated inside of pores thereof, KI that is an iodide was supported and the water repellent treatment was conducted can obtain an extremely high improvement effect of desulfurization performance about 26 times that of the catalyst of the Comparative Example 2.

Seventh Example

In the next place, in the case where the water repellent treatment is conducted as a pretreatment step of a wetting step of the inside of pores of the carbon-based catalyst and an addition, ion exchanging or supporting step of the iodine or the like and the case where the water repellent treatment is conducted as a post-treatment thereof, the respective wetting steps were conducted by impregnation under reduced pressure and steam addition to verify an influence on a necessary time for treatment and desulfurization activity ratio.

(1) A Case where a Wetting Step was Conducted as a Pretreatment of a Water Repellent Treatment by Impregnation under Reduced Pressure As an activated carbon catalyst for flue gas desulfurization in this case, the honeycomb shaped activated carbon catalyst for flue gas desulfurization of Example 2, in addition thereto, carbon-based catalysts for flue gas desulfurization obtained by keeping a reduced pressure state in a container for 6 h and 20 h and a carbon-based catalyst for flue gas desulfurization obtained by not maintaining a temperature in the container at 25° C. but by raising to 60° C., by evacuating air in the container with an exhaust pump to decompress to 0.05 atm or less and holding the state for 10 h, 4 kinds in total, were prepared.

(2) A Case where a Wetting Step was Conducted as a Pretreatment of a Water Repellent Treatment by Steam Addition

Example 9

Firstly, an amount of water vapor and an amount of air were controlled so that when water vapor and air were mixed at 135° C. followed by cooling to 100° C., water vapor in the mixed gas may condense. In the next place, a ventilation duct was partitioned with a mesh smaller than particle sizes of activated carbon and therein the activated carbon A pulverized to an average particle diameter of 20 to 200 μm was packed.

Then, as an activated carbon catalyst for flue gas desulfurization of Example 9, carbon-based catalysts for flue gas desulfurization obtained by flowing the mixed gas for 2 h and 5 h so that GHSV (=an amount of gas (m$^3$/h)/activated carbon (m$^3$)) may be 5 to 10 h$^{-1}$, and carbon-based catalysts for flue gas desulfurization obtained by flowing the mixed gas for 1 h and 2 h so that GHSV may be 15 to 20 h$^{-1}$, 4 kinds in total, were prepared. At this time, by controlling a position of addition of water vapor, a gas temperature at an inlet of an activated carbon layer was controlled so as to be 100° C. At this time, the gas was allowed to flow through activated carbon by upflow.

In the next place, an aqueous solution of KI was supported on the activated carbon by impregnation under reduced pressure. At this time, an amount of KI to be supported was dissolved to prepare a supporting amount. Then, to 90 parts by weight of KI-supported activated carbon A and activated carbon fiber E, a water dispersion of polytetrafluoroethylene (manufactured by Daikin Industries, Ltd., resinous solid content: 60% by weight) was mixed so that the solid concentration may be 10 parts by weight, followed by kneading with a pressure kneader, further followed by preparing tabular sheets having a thickness of 0.8 mm by roll. Then, from the tabular sheets, according to a method similar to the Comparative Example 1, 4 kinds of honeycomb shaped activated carbon catalysts for flue gas desulfurization of Example 9, which support KI by 5% by weight as iodine were obtained.

(3) A Case where a Wetting Step is Conducted by Impregnation under Reduced Pressure as a Post-Treatment of a Water Repellent Treatment

Example 10

Firstly, after a honeycomb shaped activated carbon catalyst was obtained according to a method similar to Comparative Example 1, the honeycomb shaped activated carbon catalyst was put into a pressure reduction vessel followed by further pouring water of about 5 times by volume a volume of the honeycomb shaped activated carbon catalyst. Then, while controlling a temperature inside of the vessel so as to be constant at 25° C., with air in the vessel evacuating with an exhaust pump, pressure was reduced to 0.05 atm or less.

Then, a honeycomb shaped activated carbon catalyst obtained, after maintaining the state for 12 h, by returning pressure inside of a vessel to atmospheric pressure (1 atmospheric pressure), a honeycomb shaped activated carbon catalyst obtained, after maintaining the state for 30 h, by returning pressure inside of a container to atmospheric pressure, and a honeycomb shaped activated carbon catalyst obtained not by maintaining a temperature inside of the vessel at 25° C. but by raising to 60° C., followed by evacuating air inside of the vessel by an exhaust pump to 0.05 atm or less, by holding the state for 25 h, further followed by returning pressure inside of the vessel to atmospheric pressure, 3 kinds in total, were prepared.

In the next place, on the honeycomb shaped activated carbon catalysts, an aqueous solution of KI was supported by spray or impregnation under reduced pressure. At this time, by dissolving an amount of KI to be supported and by controlling a supporting amount, 3 kinds of honeycomb shaped activated carbon catalysts for flue gas desulfurization involving Example 10, which support KI by 5% by weight as iodine were obtained.

(4) A Case where a Wetting Step is Conducted by Steam Addition as a Post-Treatment of a Water Repellent Treatment

Example 11

Firstly, after a honeycomb shaped activated carbon catalyst is obtained according to a method similar to Comparative Example 1, the honeycomb shaped activated carbon catalyst was housed in a ventilation duct similar to that of the Example 9, and, a mixed gas where an amount of steam and an amount of air were controlled so that water vapor may condense when water vapor at 135° C. and air were mixed and a temperature thereof came down to 100° C. was allowed to flow by upflow. At this time, a gas temperature at an inlet of an activated carbon layer was controlled so as to be 100° C.

Then, honeycomb shaped activated carbon catalysts obtained by flowing the mixed gas for 3 h and 5 h so that the GHSV may be 5 to 10 h$^{-1}$ and honeycomb shaped activated carbon catalysts obtained by flowing the mixed gas for 1 h and 2 h so that the GHSV may be 15 to 20 h$^{-1}$, in total, 4 kinds of the honeycomb shaped activated carbon catalysts were prepared.

In the next place, an aqueous solution of KI was supported on the honeycomb shaped activated carbon catalysts by spray or impregnation under reduced pressure. At this time, by dissolving an amount of KI to be supported and by controlling a supporting amount, 4 kinds of honeycomb shaped activated carbon catalysts for flue gas desulfurization involving Example 11 which support KI by 5% by weight as iodine were obtained.

Figure 7:
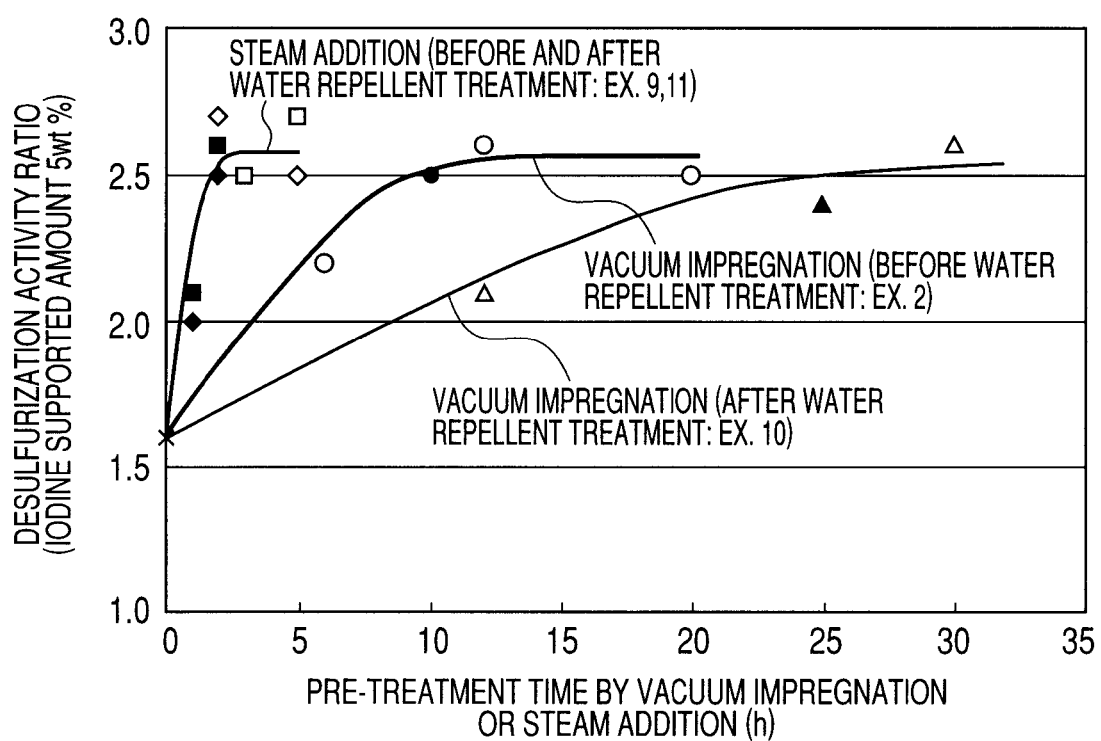
FIG. 7 is a graph illustrating by comparing times necessary for water repellent treatment and desulfurization performance in Examples 2, 9, 10 and 11 where a carbon-based catalyst of the present invention in a seventh Example is used.
Figure 9:
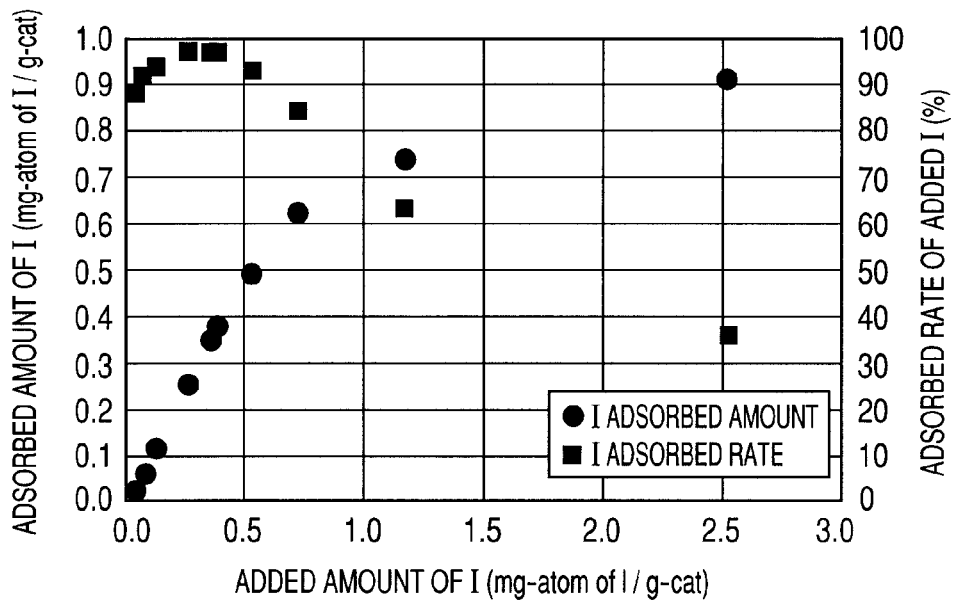
FIG. 9 is a graph illustrating relationship between an iodine amount added to a solution and an iodine adsorption amount of activated carbon.

The activated carbon catalysts for flue gas desulfurization of Examples 2, 9, 10 and 11 were used to conduct the desulfurization test under the same test conditions as that of the Comparative Example 1 to obtain the desulfurization performance thereof FIGS. 7 and 8 illustrate by comparing results of treatment times of the wetting step necessary to produce the activated carbon catalyst for flue gas desulfurization and the desulfurization performances.

From the drawing, it is found that when the wetting step is conducted, irrespective of whether the wetting step is conducted before or after the water repellent treatment, and irrespective of whether the wetting step is conducted by impregnation under reduced pressure or steam addition, all carbon-based catalysts for flue gas desulfurization can obtain the desulfurization performance higher than the activated carbon catalyst for flue gas desulfurization (desulfurization activity ratio: 1.6) of Example 1 where the wetting step was not conducted.

Furthermore, it is found that when the wetting step is conducted by use of the steam addition, comparing with the case of impregnation under reduced pressure, by a shorter treatment time, an activated carbon catalyst for flue gas desulfurization having equivalent desulfurization performance can be obtained.

Example of Mercury Adsorbent for Flue Gas Desulfurization

Example 12

Firstly, activated carbon (trade name: KURARAY COAL) was pulverized to an average particle diameter of about 50 μm by use of a vibration mill. The resulted particulate activated carbon was impregnated with a 20% sulfuric acid aqueous solution containing potassium iodide under reduced pressure and dried in air, thereby, iodine was supported so that an iodine supported amount may be 0.5 milligram-atom/g-activated carbon in terms of iodine atoms. To thus prepared 90 parts by weight of iodine-supported activated carbon, an aqueous dispersion of polytetrafluoroethylene (trade name: D-1E, manufactured by Daikin Industries Ltd., resinous solid content: 60% by weight) was mixed so as that the solid concentration may be 10 parts by weight, followed by kneading the mixture with a pressure kneader, further followed by molding into tabular sheets having a thickness of 0.8 mm by a roll. Then, a half of the tabular sheets was corrugated with a gear-shaped roll, followed by alternately laminating the resulted corrugated sheet with remaining unprocessed tabular sheet, thereby a honeycomb shaped filler for a fixed bed was prepared.

By use of test units of FIG. 10, an experiment for removing mercury in a simulated flue gas was conducted. Firstly, 0.25 L of a honeycomb shaped filler prepared as mentioned above was packed in a 50 mm×50 mm rectangular packed tower, followed by passing simulated flue gas heated at 50° C. thereto at 0.5 m$^3$/h. A composition of the flue gas at this time was as follows: metallic mercury gas concentration, 30 ppb by volume; $SO_2$ gas concentration, 1000 ppm by volume; oxygen concentration, 5% by volume; carbon dioxide concentration, 10% by volume; water vapor, 12% by volume; and the balance, nitrogen. The desulfurization rate at the gas-liquid contact section 4 was about 80%. A liquid piled up in a liquid recovery section for a fixed bed 8 was circulated to an upper portion of the fixed bed at 0.5 L/h and sprayed from above on the honeycomb shaped filler. Air was not introduced into the liquid recovery section for a fixed bed. At time points when 300 h, 700 h and 1000 h have passed from the start of gas flow, mercury concentrations in simulated flue gas at an inlet and an outlet of the fixed bed were measured and mercury removal rates were calculated. Results are shown in Table 1. $SO_2$ gas was removed at the gas-liquid contact section and fixed bed and the $SO_2$ gas removal rate at the outlet of the fixed bed was maintained at 98% or more even after a time point passing 1000 h.

Comparative Example 4

A honeycomb shaped filler was prepared in a manner similar to Example 12 except a step of impregnating a potassium iodide aqueous solution on particulate activated carbon and, under the conditions similar to Example 12, an experiment of removing mercury in the simulated flue gas was conducted. Results are shown in Table 1.

Comparative Example 5

Firstly, activated carbon (trade name: KURARAY COAL) was pulverized to an average particle diameter of about 50 μm by the use of a vibration mill. The resulted particulate activated carbon was impregnated with a 20% sulfuric acid aqueous solution containing potassium iodide under reduced pressure and thereby iodine was supported so that an iodine supported amount may be 0.5 milligram-atom/g-activated carbon in terms of iodine atoms. To 90 parts by weight of thus prepared iodine-supported activated carbon, as a molding aid, an amide resin and a polyethylene resin were mixed so as to be 10 parts by weight in total, the mixture was kneaded with a pressure kneader, followed by molding into tabular sheets having a thickness of 0.8 mm by a roll. Then, a half of the tabular sheets was corrugated by a gear-shaped roll, followed by alternately laminating the resulted corrugated sheet with remaining unprocessed tabular sheet, thereby a honeycomb shaped filler for a fixed bed was prepared. Thus-prepared honeycomb shaped filler was used to conduct an experiment of removing mercury in the simulated flue gas under the conditions similar to Example 1. Results are shown in Table 1.

Comparative Example 6

A honeycomb shaped filler was prepared in a manner similar to Comparative Example 2 except a step of impregnating a potassium iodide aqueous solution on particulate activated carbon and, under the conditions the same as Example 1, an experiment of removing mercury in the simulated flue gas was conducted. Results are shown in Table 1.

TABLE 1

|  |  | Mercury removal rate (%) | | |
|---|---|---|---|---|
|  | Content of treatment of filler | After 300 h | After 700 h | After 1000 h |
| Example 12 | Water repellent treatment + KI supporting | 100 | 98 | 95 |
| Comparative Example 4 | Water repellent treatment (without KI supporting) | 0 | 0 | 0 |
| Comparative Example 5 | KI supporting (without water repellent treatment) | 70 | 35 | 20 |
| Comparative Example 6 | Neither KI supporting nor water repellent treatment | 0 | 0 | 0 |

Example 13

Figure 11:
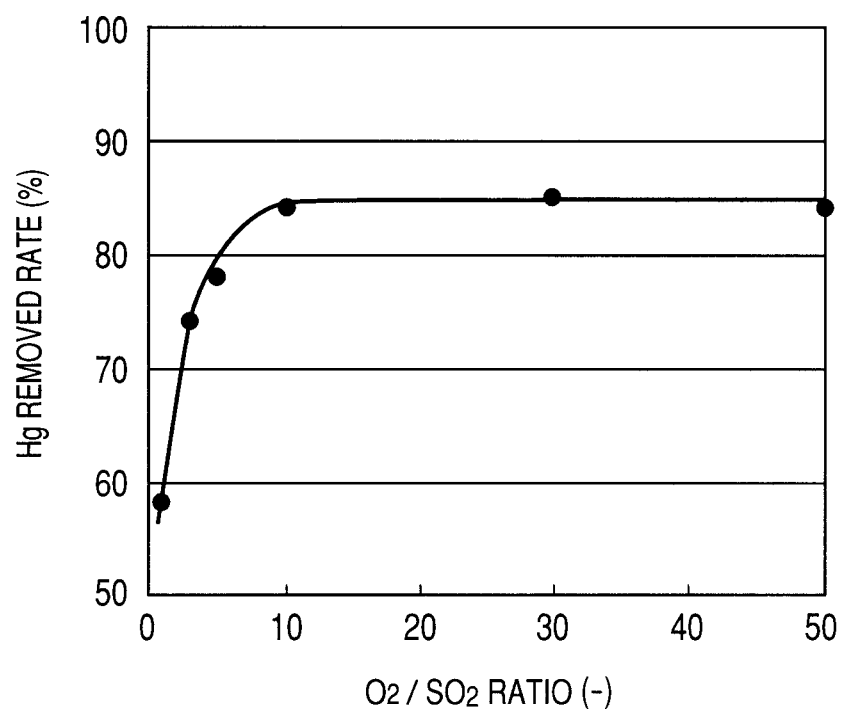
FIG. 11 is a graph illustrating relationship between molar ratio of oxygen/$SO_2$ gas in simulated flue gas and mercury removal rate.

A honeycomb shaped filler was prepared in a manner similar to Example 1. Then, 0.25 L of the prepared honeycomb shaped filler was packed in a 50 mm×50 mm rectangular packed tower, followed by passing simulated flue gas heated at 50° C. thereto at 0.5 m$^3$/h. A composition of the flue gas at this time was as follows: mercury gas concentration, 30 ppb by volume; $SO_2$ gas concentration, 1000 ppm by volume; oxygen concentration, 5% by volume; carbon dioxide concentration, 10% by volume; water vapor, 12% by volume; and the balance, nitrogen. A liquid piled up at a liquid recovery section for a fixed bed 8 was circulated to an upper portion of the adsorption tower 7 at 0.5 L/h and sprayed from above on the honeycomb shaped filler. Air was not introduced into the liquid recovery section for a fixed bed 8. At time point where 700 h has passed from the start of gas flow, an oxygen concentration at an inlet of a packed tower was varied in the range of 0 to 5% by volume. At this time, by maintaining a $SO_2$ gas concentration constant and by varying a molar ratio of oxygen/$SO_2$ gas, an influence on the mercury removal rate was investigated. Results are shown in FIG. 11. As obvious from FIG. 11, while, when the molar ratio of oxygen/$SO_2$ gas is 10 or more, the mercury removal rate such high as about 85% can be obtained, under the condition where the molar ratio of oxygen/$SO_2$ is small, the mercury removal rate decreases. Accordingly, when an oxygen concentration in the flue gas flowing into the adsorption tower is extremely low, it is preferred to introduce air in the flue gas to increase the molar ratio of oxygen/$SO_2$ gas to 10 or more.

Example 14

A honeycomb shaped filler was prepared in a manner similar to Example 12 and an experiment of removing mercury in simulated flue gas was conducted under the conditions similar to Example 12 except that air was introduced at 30 L/h to the liquid recovery section for a fixed bed 8. As the results thereof, at a time point after 700 h has passed from the start of gas flow, the mercury removal rate was 95%. From this, it is found effective to introduce air to a liquid sprayed to the mercury adsorbent to heighten the ORP.

This application claims the benefit of Japanese Patent Application No. 2008-071771, filed on Mar. 19, 2008, which is hereby incorporated by reference in its entirety.

The invention claimed is:

1. A carbon-based catalyst for flue gas desulfurization that is brought into contact with a flue gas containing at least $SO_2$ gas, oxygen and water vapor so that the $SO_2$ gas can react with the oxygen and the water vapor to form sulfuric acid which is to be recovered,
   wherein, on a surface of the carbon-based catalyst, iodine, bromine or a compound thereof is added, ion exchanged or supported and a water-repellent treatment is applied to the carbon-base catalyst,
   wherein the carbon-based catalyst contains a resin having a contact angle with water of 90° or more as a result of the water repellent treatment,
   wherein, after a carbon-based catalyst is moistened to clog the inside of pores thereof with water, a solution containing iodine, bromine or a compound thereof is sprayed or sprinkled to the carbon-based catalyst or the carbon-based catalyst is dipped in the solution to add, ion exchange or support iodine, bromine or a compound thereof on a surface of the carbon-based catalyst, the carbon-based catalyst being moistened in such a way that the carbon-based catalyst and water are put in a vessel and the inside of the vessel is depressurized and, after maintaining the state for a certain time, is returned to atmospheric pressure, or that a mixed gas of water vapor and air is allowed to flow through the carbon-based catalyst to condense the water vapor.

2. The carbon-based catalyst according to claim 1, wherein the carbon-based catalyst is an activated carbon or an activated carbon fiber.

3. The carbon-based catalyst according to claim 2, wherein the activated carbon is a molded body comprised of particulate activated carbon having an average particle diameter of 20 to 200 μm.

4. The carbon-based catalyst according to claim 1, wherein the compound of iodine or bromine is any of alkali metal salts, alkaline earth metal salts, transition metal salts, hydrides, oxo acids and organic compounds of iodine or bromine.

5. The carbon-based catalyst according to claim 1, wherein the added, ion exchanged or supported amount of iodine or a compound thereof on the carbon-based catalyst is in the range of, as iodine, 0.020% by weight or more and 60% by weight or less.

6. The carbon-based catalyst according to claim 1, wherein the added, ion exchanged or supported amount of bromine or a compound thereof on the carbon-based catalyst is in the range of, as bromine, 0.010% by weight or more and 60% by weight or less.

7. The carbon-based catalyst according to claim 1, wherein the supported amount of iodine, bromine or a compound thereof is 0.001 to 0.8 milligram-atoms in terms of iodine or bromine atoms per gram of the carbon-based catalyst.

8. A method of producing a carbon-based catalyst for flue gas desulfurization that is brought into contact with a flue gas containing at least $SO_2$ gas, oxygen and water vapor so that the $SO_2$ gas can react with the oxygen and the water vapor to form sulfuric acid which is to be recovered,
   wherein, after a carbon-based catalyst is moistened to clog the inside of pores thereof, a solution containing iodine, bromine or a compound thereof is sprayed or sprinkled to the carbon-based catalyst or the carbon-based catalyst is dipped in the solution to add, ion exchange or support iodine, bromine or a compound thereof on a surface of the carbon-based catalyst, and
   a water-repellent treatment is applied to the carbon-base catalyst.

9. The method according to claim 8, wherein the carbon-based catalyst and water are put in a vessel and the inside of the vessel is depressurized and, after maintaining the state for a certain time, is returned to atmospheric pressure to clog the inside of pores of the carbon-based catalyst with the water.

10. The method according to claim 8, wherein a mixed gas of water vapor and air is allowed to flow through the carbon-based catalyst to condense the water vapor to clog the inside of pores of the carbon-based catalyst with condensed water.

11. A flue gas desulfurization method, wherein a flue gas containing at least $SO_2$ gas, oxygen and water vapor is brought into contact with a carbon-based catalyst according to claim 1 with a surface of the carbon-based catalyst maintained in a wet state.

12. The method according to claim 11, wherein the flue gas further contains mercury and the mercury in the flue gas is simultaneously removed.

13. The method according to claim 12, wherein the supported amount of iodine, bromine or a compound thereof is 0.001 to 0.8 milligram-atoms in terms of iodine or bromine per gram of the carbon-based material.

14. The method according to claim 11, wherein the flue gas is an exit gas of a wet flue gas desulfurization apparatus.

15. The method according to claim 14, wherein industrial water or a dilute sulfuric acid solution is continuously or intermittently sprayed to the carbon-based catalyst to maintain a wet state and an effluent flowing out of the carbon-based catalyst is supplied to the wet flue gas desulfurization apparatus.

16. The method according to claim 15, wherein the effluent flowing out of the carbon-based catalyst is adsorbed or ion exchanged to remove iodine or bromine and thereafter supplied to the wet flue gas desulfurization apparatus.

17. The method according to claim 15, wherein the effluent flowing out of the carbon-based catalyst is temporarily retained, a part thereof is circulated and sprayed to the carbon-based catalyst and another part thereof is supplied to the wet flue gas desulfurization apparatus.

18. The method according to claim 15, wherein the industrial water or the dilute sulfuric acid solution into which air is introduced or to which an oxidizing agent is added is sprayed.

19. The method according to claim 18, wherein when a metallic mercury removal performance of the carbon-based catalyst becomes a predetermined value or less, the amount of introducing air or the amount of adding an oxidizing agent to the industrial water or the dilute sulfuric acid solution is increased.

20. The method according to claim 15, wherein when a metallic mercury removal performance of the carbon-based catalyst becomes a predetermined value or less, iodine, bromine or a compound thereof is added to the industrial water or the dilute sulfuric acid solution.

21. The method according to claim 11, wherein the molar ratio of oxygen to $SO_2$ gas in the flue gas is 10 or more.

22. The method according to claim 21, wherein the molar concentrations of oxygen and $SO_2$ gas in the flue gas are measured and air is introduced in the flue gas so as for the molar ratio of oxygen to $SO_2$ gas to be 10 or more.

* * * * *